(12) United States Patent
Couillard et al.

(10) Patent No.: US 6,540,854 B2
(45) Date of Patent: *Apr. 1, 2003

(54) LOAD CELL CLOSED LOOP CONTROL FOR ROTARY ULTRASONIC BONDING APPARATUS

(75) Inventors: Jack Lee Couillard, Menasha, WI (US); Michael Lee Lohoff, Oshkosh, WI (US); Scott Gerald Chapple, Neenah, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 114 days.

This patent is subject to a terminal disclaimer.

(21) Appl. No.: 09/728,210

(22) Filed: Nov. 30, 2000

(65) Prior Publication Data

US 2002/0062903 A1 May 30, 2002

(51) Int. Cl.[7] ............................................. B29C 65/08
(52) U.S. Cl. ................... 156/64; 156/73.1; 156/290; 156/308.4; 156/358; 156/553; 156/555; 156/580.2; 156/582
(58) Field of Search .................. 156/64, 73.1, 290, 156/308.2, 308.4, 324, 358, 553, 555, 580.1, 580.2, 582, 583.1, 367, 378, 379

(56) References Cited

U.S. PATENT DOCUMENTS

| 4,083,737 A | 4/1978 | Foote, Jr. et al. ......... 156/73.1 |
|---|---|---|
| 4,470,293 A | 9/1984 | Redmon ......................... 73/12 |
| 4,479,386 A | 10/1984 | Beggs et al. ................... 73/582 |
| 4,696,708 A * | 9/1987 | Keller et al. ................... 156/64 |
| 5,458,002 A | 10/1995 | Askea et al. .................. 73/789 |
| 5,707,470 A | 1/1998 | Rajala et al. ............... 156/73.2 |
| 5,711,847 A | 1/1998 | Rajala et al. ............ 156/580.2 |
| 5,855,706 A * | 1/1999 | Grewell ........................ 156/64 |
| 6,123,792 A | 9/2000 | Samida et al. ............. 156/73.1 |
| 6,190,296 B1 * | 2/2001 | Gnad et al. ..................... 493/8 |

* cited by examiner

*Primary Examiner*—James Sells
(74) *Attorney, Agent, or Firm*—Wilhelm Law Service; Thomas D. Wilhelm

(57) ABSTRACT

Apparatus and methods for effecting ultrasonic bonds in sequentially advancing workpiece segments, in a nip defined by a rotary ultrasonic horn and rotary anvil roll. The ultrasonic bonding apparatus comprises support structure comprising anvil support apparatus and horn support apparatus. A closed loop control apparatus is connected to one or both of the anvil support apparatus and horn support apparatus. The closed loop control apparatus comprises a programmable logic controller, a load cell, and an adjustor. Information output from the load cell triggers the closed loop control apparatus through the programmable logic computer and the adjustor to move one or both of the anvil support apparatus and horn support apparatus toward or away from the other in dynamic response to the information output from the load cell, thereby regulating pressure in the nip with ongoing real-time adjustments to distance between the anvil support apparatus and the horn support apparatus.

40 Claims, 9 Drawing Sheets

LOAD CELL CLOSED LOOP CONTROL FOR ROTARY ULTRASONIC BONDING APPARATUS

BACKGROUND

The present invention relates to apparatus and methods for creating ultrasonic bonds in a web or webs, and/or in discrete workpiece segments, optionally in combination with a web or webs, using ultrasonic bonding apparatus. The invention more particularly concerns apparatus and methods for ultrasonically bonding a web or webs, and/or discrete workpiece segments, optionally in combination with a web or webs, using a rotary ultrasonic horn and a rotary anvil.

Bond strength, where a rotary ultrasonic horn and a rotary anvil are used to bond webs, or discrete workpiece segments is dependent on a variety of factors including horn frequency, horn amplitude, dwell time in the nip, bond pattern, and nip loading. More specifically, the consistency and quality of the bond when using such rotary bonding techniques is significantly dependent on the consistency of the force exerted on the web by the combination of the anvil roll and the rotary ultrasonic horn; the time during which the web is being pressed in the constrictive nip which is dependent in part on the operating speed at the nip; and the nature of the materials being bonded. The consistency and quality of the bonds are also dependent on the frequency and amplitude of the vibrations of the ultrasonic horn.

Consistency and quality of bonds when using conventional rotary ultrasonic bonding methods and apparatus have been particularly variable where the desired bond pattern is intermittently imposed on the material passing through the bonding nip because the nip pressures inherently change in concert with the intermittent nature of the bonding operation.

When nip loading is excessive, so much energy may be applied to the materials being bonded as to burn through or otherwise excessively soften the materials being bonded, as well as to apply so much pressure to the softened materials that the bonds so formed may be weak, and/or may be uncomfortably harsh to the touch of a wearer's skin. In the alternative, excessive loading can physically damage, as by tearing, the material being bonded. Additionally, excessive loading can increase wear or coining and thus damage the ultrasonic horn.

In the past, control of the nip force has evolved from constant force to fixed interference. More specifically, early practice in the art of ultrasonic bonding was to force an anvil against a horn with a fixed, defined load. The anvil rode on the horn much like a train wheel runs on a rail. The force applied was substantially constant regardless of the presence or absence of material in the nip. The constant force of the fixed load design at high force levels tended to cause rapid horn wear.

The next step in the evolution of ultrasonic bonding was to load the anvil roll with high force against a fixed stop and to use the stop to establish interference. In this design, the stop drew a relatively high fraction of the load until material entered the nip; at that point, the greater interference caused by the material drew more of the load as the stop load diminished.

A need exists to develop apparatus and methods for loading a nip to a known force rather than loading to a fixed interference. Similarly, a need exists to develop apparatus and methods for loading a nip including measuring and adjusting a nip load as a direct reading of force rather than as an inferred value from a change in interference.

It is another object of this invention to provide ultrasonic bonding apparatus and methods wherein the bonding apparatus transmits a real-time ongoing and dynamic signal output to apparatus which is designed and configured to automatically adjust nip loading toward a known target load, without ongoing real-time human intervention.

It is yet another object of this invention to provide bonding apparatus and methods wherein a portion of the bonding apparatus can be automatically raised or lowered in response to detected nip loading output until the force applied to the respective portion of bonding apparatus results in desired ultrasonic bond-creating pressure in the nip.

SUMMARY

In a first family of embodiments, the invention comprehends ultrasonic bonding apparatus for creating ultrasonic bonds in sequentially advancing workpiece segments, in a nip defined by a rotary ultrasonic horn mounted for rotation about a first axis, and a rotary anvil roll mounted for rotation about a second axis substantially aligned with the first axis. The anvil roll comprises a width, a circumference, and a bonding portion disposed about at least a portion of the circumference. The ultrasonic bonding apparatus comprises support structure comprising anvil support apparatus and the horn support apparatus. The anvil support apparatus is connected to the anvil roll, and horn support apparatus is connected to the ultrasonic horn. The support structure supports the bonding apparatus from an underlying support. The anvil support apparatus comprises an anvil moving assembly for moving the anvil roll into contact with the ultrasonic horn, and for moving the anvil roll out of contact with the ultrasonic horn. Closed loop control apparatus is connected to one of the anvil support apparatus and the horn support apparatus. The closed loop control apparatus comprises a programmable logic controller, a load cell, and an adjustor. The ultrasonic horn and the anvil roll collectively are mounted and configured such that the ultrasonic horn and the anvil roll can be brought together to define the nip therebetween, wherein the anvil roll and the ultrasonic horn can rotate in common with movement of workpiece segments through the nip. Information output from the load cell triggers the closed loop control apparatus through the programmable logic computer and the adjustor to move the one of the anvil support apparatus and the horn support apparatus toward and away from the other of the anvil support apparatus and the horn support apparatus in automatic and dynamic response to the information output from the load cell, thereby regulating pressure in the nip with ongoing real-time adjustments to distance between the anvil support apparatus and the horn support apparatus without real-time operator intervention.

In preferred embodiments, the load cell is arranged and configured to measure representative nip loads, thereby to define forces generated between the ultrasonic horn and the anvil roll.

In some embodiments, the adjustor comprises a servo motor.

In some embodiments, the invention comprises a load cell conditioner connected to the load cell. The load cell conditioner functions to amplify output from the load cell.

Preferred embodiments can include a back-up roll juxtaposed adjacent the ultrasonic horn, opposite the anvil roll, wherein the back-up roll engages an outer surface of the ultrasonic horn at an engagement locus in alignment with a line extending through extensions of the first and second axes.

In some embodiments, the invention includes a second adjustor mounted and configured for adjusting a height of the back-up roll, and thus generally defining a limit to movement of the ultrasonic horn away from the anvil roll.

In some embodiments, the closed loop control apparatus is connected to the horn support apparatus.

In other embodiments, the closed loop control apparatus is connected to the anvil support apparatus.

In some embodiments, the anvil moving assembly defines a limit to travel of the anvil support apparatus away from the horn support apparatus, thus defining a limitation to withdrawal of the anvil roll from the nip.

In some embodiments, the invention includes first and second support rolls releasably supporting opposing sides of an outer surface of the ultrasonic horn. Axes of the first and second support rolls can be positioned lower than the axis of the ultrasonic horn, whereby urging the first and second support rolls inwardly against the outer surface of the ultrasonic horn lifts the ultrasonic horn upwardly against the back-up roll.

In some embodiments, the invention includes drawing apparatus, capable of drawing the workpiece segments through the bonding apparatus, across the anvil roll, and thus through the nip defined between the anvil roll and the ultrasonic horn, at a threading speed of at least about 40 feet per minute, preferably at a speed of at least about 600 feet per minute, more preferably at a speed of at least about 1000 feet per minute.

In preferred embodiments, the support structure is sufficiently rigid that the ultrasonic horn and the anvil roll can be brought together with deflection levels of the horn support apparatus and the anvil support apparatus, in combination, being no more than about 0.003 inch in combination with defining sufficient nip pressure to develop ultrasonic bonds in the workpiece segments passing through the nip. Deflection is calculated using the formula, $d=(Fl^3)/3EI$, wherein "F" represents the force expressed in the nip, "I" represents the length of the support structure, "E" represents the modulus of elasticity of the material comprising the support structure, and "I" represents the moment of inertia for the cross-sectional area of the support structure. The moment of inertia for a support structure having a solid rectangular cross-section is calculated using the formula, $I=(bh^3)/12$, wherein "b" represents the length of the base of the support structure, and "h" represents the height of the support structure. The moment of inertia for a support structure having a solid circular cross-section is calculated using the formula, $I=(\pi d^4)/64$, wherein "d" represents the diameter the circular support structure.

In a second family of embodiments, the invention comprehends closed loop control apparatus for managing pressure generated in a nip. The nip is defined between a rotary ultrasonic horn mounted for rotation about a first axis and an anvil roll mounted for rotation about a second axis, substantially aligned with the first axis. The anvil roll is mounted to support structure by anvil support apparatus, and the ultrasonic horn is mounted to the support structure by horn support apparatus. The closed loop control apparatus comprises a load cell, a programmable logic controller, and an adjustor. The load cell is connected to one of the anvil support apparatus and the horn support apparatus. The load cell quantifies force representative of pressure being generated in the nip. The programmable logic controller is connected to the load cell and to the adjustor, for communication with the load cell and the adjustor. The adjustor is mounted in adjusting relationship with the anvil support apparatus.

In preferred embodiments, the closed loop control apparatus further comprises a strain gauge isolated transmitter converting force applied on the load cell into signal output.

The load cell preferably functions to transmit the signal output to the programmable logic controller.

In some embodiments, the anvil support apparatus can be raised or lowered by the adjustor in response to output of the load cell and the programmable logic controller until force applied to the anvil support apparatus results in desired ultrasonic bond-creating pressure in the nip.

The horn is preferably mounted from a horn support apparatus having a first end portion mounted to the support structure, and a second end portion remote from the first end portion, and disposed on a horn moving assembly.

In some embodiments, the closed loop control apparatus is operatively connected to the anvil support apparatus, and a second closed loop control apparatus is connected to the horn moving assembly, thereby providing a second control for managing pressure in the nip. The second closed loop control apparatus comprises a second adjustor mounted in adjusting relationship with the horn moving assembly, and a second load cell connected to one of the horn moving assembly and the second adjustor, and outputting information to a suitable programmable logic controller.

In a third family of embodiments, the invention comprehends a method of creating ultrasonic bonds in sequentially advancing workpiece segments. The method comprises passing the workpiece segments through a nip, activating ultrasonic energy in an ultrasonic horn at the nip, and thereby creating ultrasonic energy in workpiece segments passing through the nip. The nip is defined by a support structure comprising anvil support apparatus, horn support apparatus, and closed loop control apparatus. The anvil support apparatus supports an anvil roll mounted for rotation about a first axis. The horn support apparatus is connected to and supports a rotary ultrasonic horn mounted for rotation about a second axis, substantially aligned with the first axis. The anvil support apparatus comprises an anvil moving assembly for moving the anvil roll into contact with the ultrasonic horn, and for moving the anvil roll out of contact with the ultrasonic horn. The closed loop control apparatus is connected to one of the anvil support apparatus and the horn support apparatus, and comprises a programmable logic controller, a load cell, and an adjustor. The method also includes rotating the ultrasonic horn and the anvil roll in common with movement of the workpiece segments through the nip, thereby applying pressure to the workpiece segments at the nip and correspondingly creating ultrasonic bonds in the workpiece segments passing through the nip.

In preferred embodiments, the method includes sensing nip loads using the load cell, the nip loads representing forces expressed between the ultrasonic horn and the anvil roll at the nip.

In some embodiments, the method includes employing the horn support apparatus and the anvil support apparatus, collectively, thereby to define a set-point target nip pressure of at least about 400 pounds per inch width of the nip, the nip having a width defined between the ultrasonic horn and the anvil roll.

In some embodiments, the method includes initiating adjustment to the anvil moving assembly when nip load deviates from a target nip load by at least about 10 pounds per inch width of the nip.

In some embodiments, the method includes adjusting the anvil moving assembly when loading in the nip corresponding to a bonding portion of the anvil roll varies by more than about 10 pounds per inch width of the nip from the target nip loading.

In some embodiments, the method includes connecting the closed loop control apparatus to the horn support apparatus.

In other embodiments, the method includes connecting the closed loop control apparatus to the anvil support apparatus. In yet other embodiments, the method includes managing pressure in the nip by employing a second closed loop control apparatus connected to the horn support apparatus in combination with the closed loop control which is connected to the anvil support apparatus.

In preferred embodiments, the method includes processing information output from the load cell in the programmable logic controller and correspondingly raising and lowering one or both of the anvil moving assembly or the horn support apparatus, thereby regulating the pressure in the nip.

Preferred embodiments of the method comprise applying first and second support rolls to sides of the ultrasonic horn and moving the ultrasonic horn into engagement with a back-up roll aligned with extensions of the first and second axes such that the first and second support rolls, in combination with the back-up roll, define a fixed location of operation of the ultrasonic horn.

In preferred embodiments, the bringing of the anvil roll and the ultrasonic horn together comprises lifting the anvil roll, thereby to bring the anvil roll into engaging relationship with the ultrasonic horn.

Preferred embodiments generally include limiting downward movement of the anvil moving assembly and thereby preventing disengagement of drive apparatus which transmits drive power between the anvil support apparatus and the horn support apparatus.

In some embodiments, the method includes adjusting height of the back-up roll and thereby controlling the location of operation of the ultrasonic horn.

In some embodiments, the method also comprises releasing the support rolls, causing the horn to drop out of engagement with the back-up roll, and subsequently re-engaging the support rolls with the ultrasonic horn, and thus bringing the ultrasonic horn back into engagement with the back-up roll, and thereby returning the ultrasonic horn to the defined location of operation of the ultrasonic horn.

In preferred embodiments, the method includes using the load cell to measure, and to dynamically manage, nip loads expressed in the nip, in real time.

Preferred embodiments of the method also generally include urging the anvil support apparatus, and the horn support apparatus together, wherein the anvil support apparatus and the horn support apparatus, collectively, are sufficiently rigid that the ultrasonic horn and the anvil roll can be brought together with deflection levels of the horn support apparatus and the anvil support apparatus being no more than about 0.003 inch in combination with defining sufficient nip pressure to develop ultrasonic bonds in the workpiece segments passing through the nip.

In a fourth family of embodiments, the invention comprehends a method of managing and regulating pressure generated in a nip. The nip is defined between a rotary ultrasonic horn mounted on horn support apparatus, and an anvil roll mounted on anvil support apparatus. The anvil support apparatus is mounted to a support structure, and defines an adjustable anvil moving assembly. The horn is mounted in general alignment with the anvil roll to define the nip therebetween such that outer working surfaces of the ultrasonic horn and the anvil roll are generally defined in a common surface at the nip. The method comprises employing a load cell connected to one of the horn support apparatus and the anvil support apparatus, and thereby receiving and quantifying force representative of force expressed between the ultrasonic horn and the anvil roll at the nip. The method also comprises converting the force applied at the load cell into a communications signal output. The method additionally comprises transmitting the communications signal output to a programmable logic controller programmed to activate an adjustor. The method further comprises employing the adjustor to raise or lower the respective anvil support apparatus or horn support apparatus so as to adjust the force being expressed between the anvil roll and the ultrasonic horn at the nip to a desired bond-creating pressure.

In some embodiments, the method includes employing a target nip pressure of at least about 400 pounds per inch width of the nip.

In preferred embodiments, the method includes initiating adjustment of location of the respective anvil support apparatus or horn support apparatus when pressure in the nip deviates from the target nip pressure by a defined number of pounds per inch width of the nip.

Preferred embodiments generally include adjusting the location of the respective anvil support apparatus or horn support apparatus when pressure in the nip corresponding to a bonding portion of the anvil roll deviates from the target nip pressure by a defined number of pounds such as about 10 pounds per inch width of the nip.

In some embodiments, the method includes the horn support apparatus having a first end portion fixed to the support structure, and a second end portion remote from the first end portion, disposed on a horn moving assembly, the method including at least in part managing pressure in the nip by connecting closed loop control apparatus to the horn moving assembly.

In some embodiments, the method includes limiting downward movement of the anvil roll and thereby preventing disengagement of drive apparatus which transmits drive power between the anvil roll and the ultrasonic horn.

Figure 1:
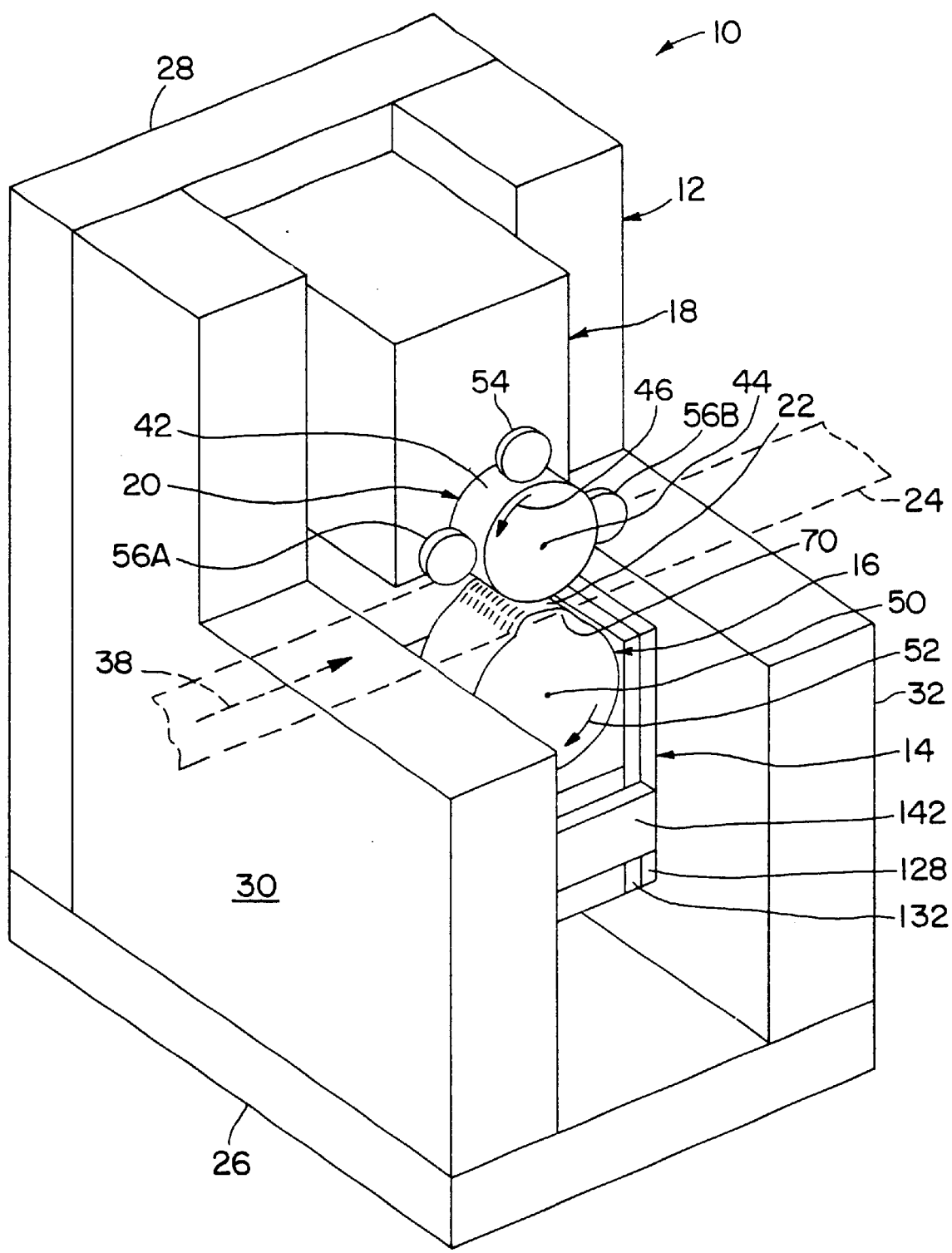
FIG. 1 shows an overall representative pictorial view of bonding apparatus of the invention, including ultrasonic horn and support apparatus, anvil and support apparatus, and a frame supporting both the horn and the anvil.

The invention is not limited in its application to the details of construction or the arrangement of the components set forth in the following description or illustrated in the drawings. The invention is capable of other embodiments or of being practiced or carried out in various other ways. Also, it is to be understood that the terminology and phraseology employed herein is for purpose of description and illustration and should not be regarded as limiting. Like reference numerals are used to indicate like components.

DESCRIPTION OF THE ILLUSTRATED EMBODIMENTS

The invention provides apparatus and methods for using a closed loop control to measure nip loading in a rotary ultrasonic bonding nip, and to maintain a stable level of force in the nip while effecting ultrasonic bonds on a continuously moving web or webs, and/or such stream of workpiece segments. The apparatus and methods can be used in maintaining substantially stable force levels while effecting an overall bonding pattern in workpiece segments, bonding second workplace segments to first workpiece segments, bonding discrete elements to a web or to workpiece segments, and fashioning bonded regions spaced along one or both the length and width of such web, webs, and/or workpiece segments. Apparatus and methods of the invention are particularly useful for e.g. ultrasonically bonding selected components into or in absorbent articles using rotary ultrasonic horns and cooperating rotary anvils. The apparatus and methods can be used for bonding two workpiece segments to each other to form a composite e.g. substrate material, and wherein the composite substrate material is optionally used subsequently in an absorbent article such as, for example, a disposable diaper. The present invention is particularly useful in bonding one or more layers of material which preferably are made, at least in part, from thermoplastic polymers.

In particular, apparatus and methods of the present invention can be used, for example, to form a waist band in a disposable diaper. Such waist band may be formed e.g. by bonding a waist band element to a workpiece segment or by forming bonds internally within the workpiece segment. In the alternative, apparatus and methods of the invention can be used e.g. to attach mounting ears to a diaper, to attach a landing strip to a diaper, or to form side seams on training pants. In addition, apparatus and methods of the present invention can be used in manufacture of absorbent articles other than diapers, such as, for example, training pants, feminine care products, incontinence garments, hospital gowns, and the like. All such alternative methods, configurations, and articles are contemplated as being within the scope of the present invention. In light of the disclosure herein, other uses of the invention in connection with absorbent and other e.g. personal care articles of manufacture will be obvious to those skilled in the art.

Where the invention is used in making waist bands, the heights of the waist bands, e.g. as oriented on the body of a wearer, may be aligned along the length of the workplace segment, such that bonding of the waist band regions represents an intermittent and timed discontinuous bonding process, having non-bonded areas of the workpiece segment disposed between longitudinally spaced waist-bonded regions. So-bonded waist band regions enhance fit and comfort of the diaper or other personal care article about the waist of the wearer.

Figure 2:
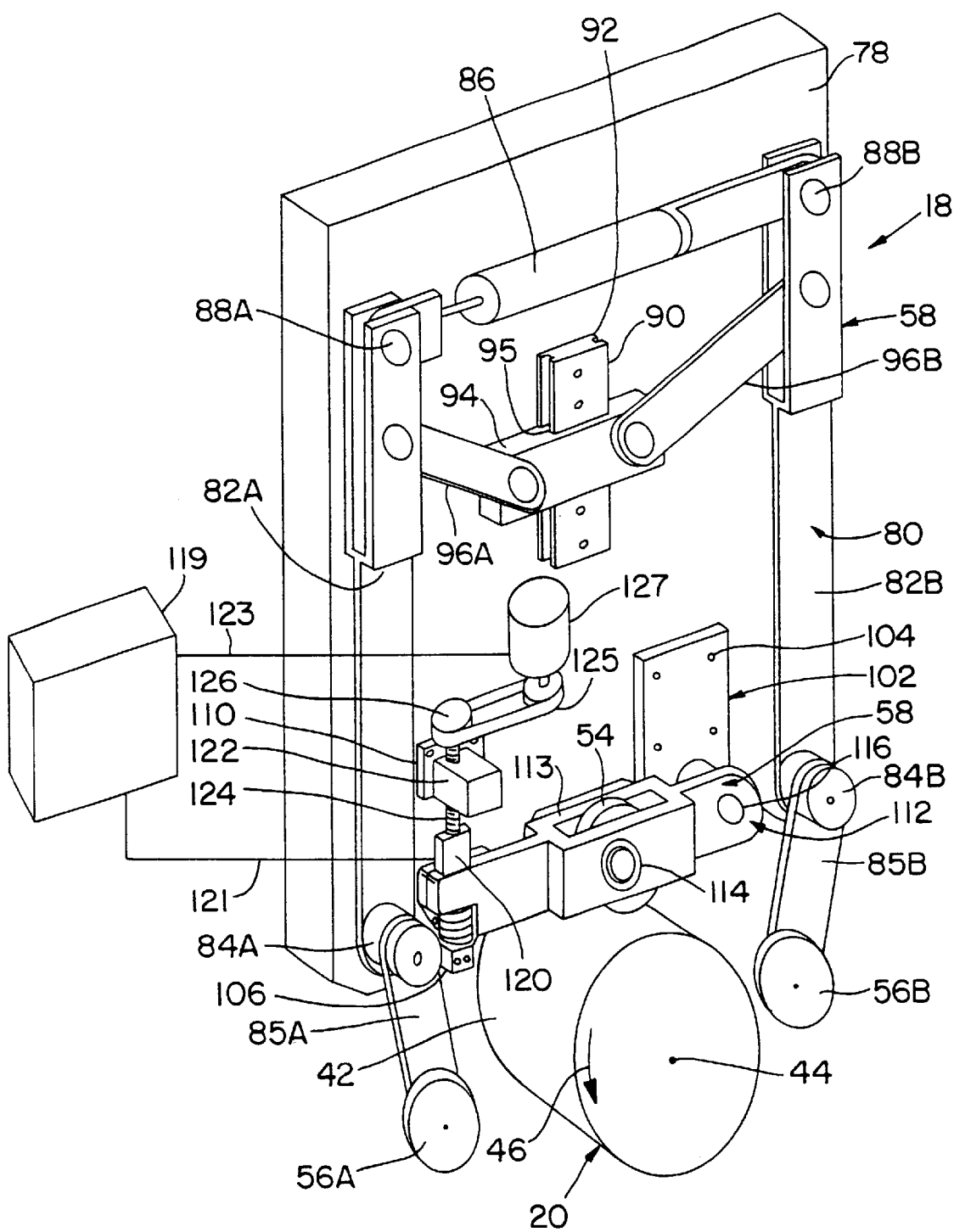
FIG. 2 shows a more detailed representative pictorial view of ultrasonic horn support apparatus illustrated in FIG. 1.
Figure 3:
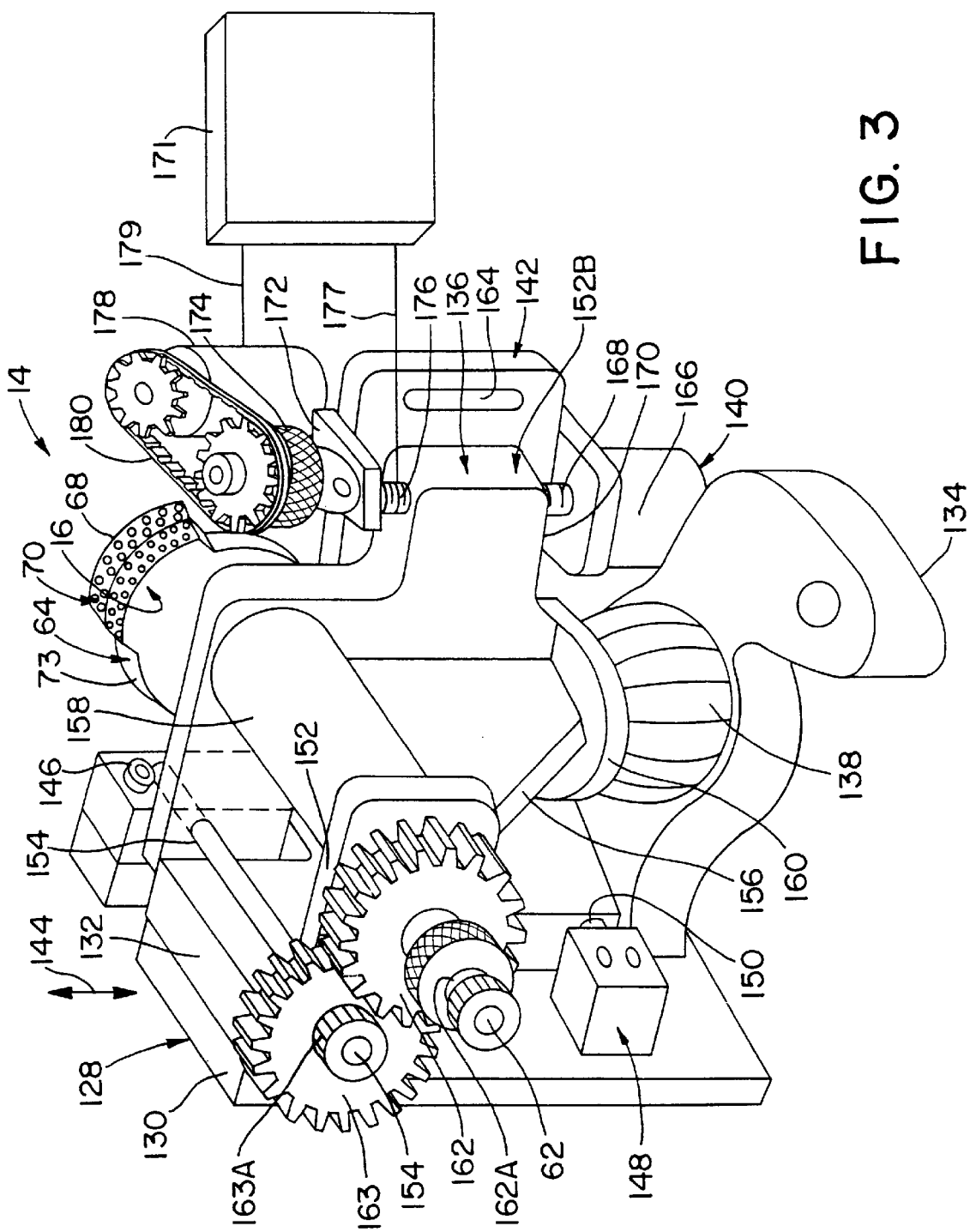
FIG. 3 shows a more detailed representative pictorial view of anvil support apparatus illustrated in FIG. 1.
Figure 4:
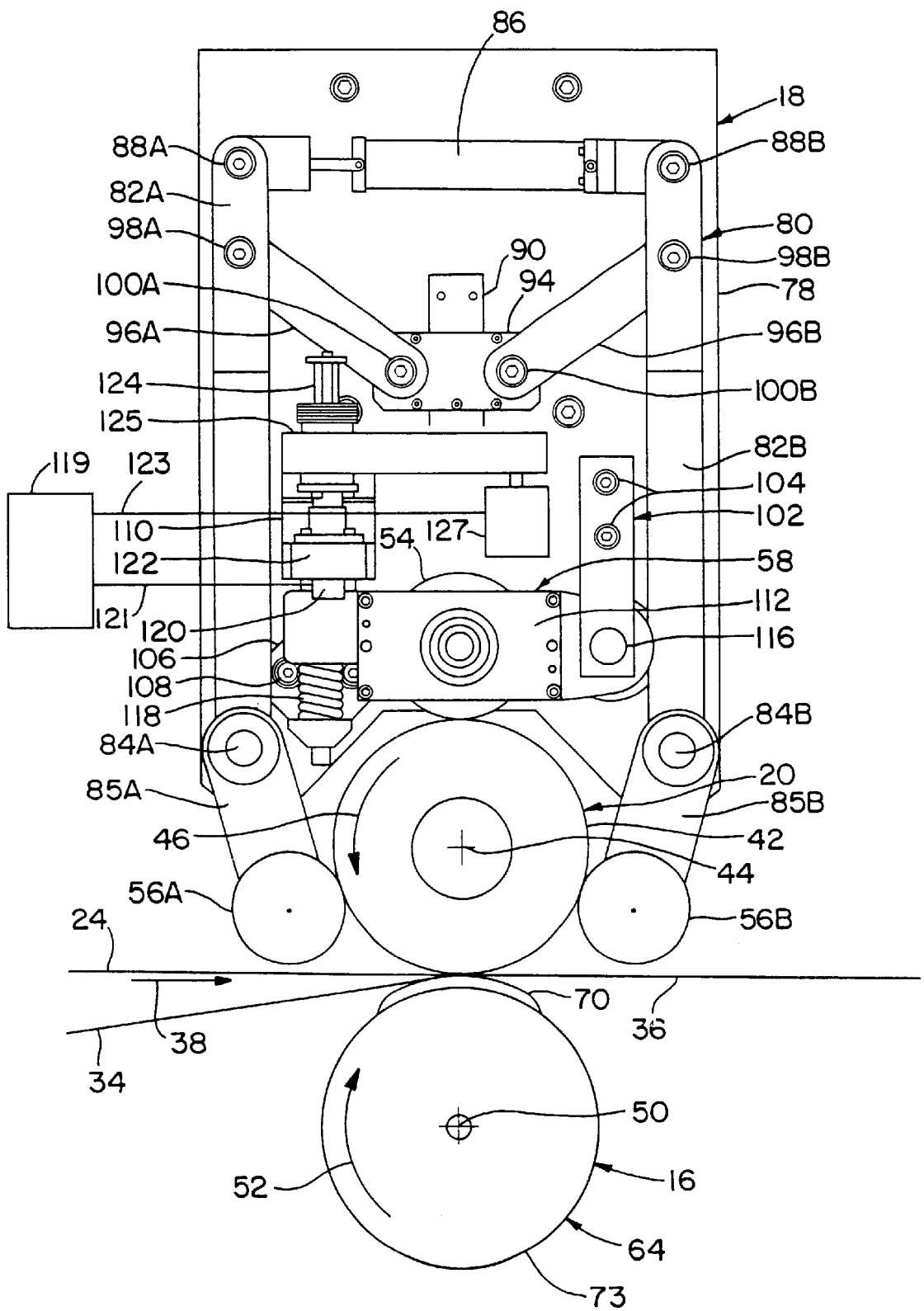
FIG. 4 shows a front elevation view of a representative ultrasonic horn support apparatus illustrated in FIG. 1, showing first and second webs progressing through a nip defined between an ultrasonic horn and a cooperating anvil.

Referring to the drawings, FIG. 1 illustrates in semi-block format, the general locations of the major elements and assemblies of apparatus of the invention. As illustrated in FIG. 1, bonding apparatus 10 of the invention generally comprises a frame 12, anvil support apparatus 14 supporting an anvil roll 16, and horn support apparatus 18 supporting an ultrasonic horn 20. Together, horn 20 and anvil roll 16 form a bonding nip 22 which is illustratively bonding a workpiece segment 24 shown in dashed outline passing through the nip. FIGS. 2 and 4 illustrate details of horn support apparatus 18. FIG. 3 illustrates details of anvil support apparatus 14.

Referring back to FIG. 1, frame 12 is fabricated from a rigid, stiff material such as metal. Preferred metals include a variety of well known stiff and rigid steel or cast iron compositions. Frame 12 includes a base plate 26, a rear plate 28 rigidly mounted to base plate 26 e.g. by welding or bolting, and left and right side plates 30, 32, each being respectively rigidly mounted to both base plate 26 and rear plate 28 e.g. as by welding or bolting. Side plates 30, 32 are each rigidly mounted to both base plate 26 and rear plate 28 whereby the so-defined frame 12 provides a support assembly suitably rigid for supporting the anvil support structure and the horn support structure, thereby to provide an increased level of structural rigidity at nip 22 while also providing for release from such rigidity to accommodate variations in thickness of the e.g. workpiece segment material passing through the nip.

Referring now to FIGS. 1 and 2, horn support apparatus 18 can be used in combination with anvil support apparatus 14 to develop bonds in a continuously moving workpiece segment 24. In the alternative, anvil support apparatus 18 and horn support apparatus 14 can be used to bond two or more workpiece segments 24, 34 to each other as illustrated in FIG. 4 or to bond discrete elements to a workpiece segment or discrete elements to each other when at least one of the elements is already mounted or bonded to such workpiece segment. In any event, a continuous workpiece segment is preferably involved in the bonding process, whether as a support for elements being bonded to each other, as a continuous element being bonded either to another continuous element or to discrete spaced elements, or as a continuous element being bonded internally within its own structure. Workpiece segment 24 is continuously moving along a substrate path 36 in the direction indicated by arrow 38.

Horn support apparatus 18 includes rotating ultrasonic horn 20 as a bonding roll supported adjacent and above workpiece segment 24. Horn 20 has an outer peripheral bonding surface 42 which contacts and acts upon workpiece segment 24, and which rotates about a horn axis 44 in the direction indicated by arrow 46. Rotatable anvil roll 16, part of anvil support apparatus 14, is located adjacent horn 20. Anvil roll 16 is configured to rotate about anvil axis 50 in the direction indicated by arrow 52 associated therewith to press workpiece segment 24 against bonding surface 42 of horn 20, thereby creating bonds at workpiece segment 24.

In the embodiments illustrated in FIGS. 1, 2. 4, and 5, outer peripheral bonding surface 42 is contacted and supported by back-up roll 54 and first and second support rolls 56A and 56B. In the. illustrated examples, rolls 54, 56A, and 56B are spaced at regular intervals about outer peripheral bonding surface 42 of horn 20 so as to maintain the horn in a substantially fixed position while the horn is being used to form ultrasonic bonds.

Horn support apparatus 18 includes horn support assembly 58 which is configured to bring support rolls 56A and 56B into contact with outer bonding surface 42 of horn 20, and raise horn 20 into contact with the outer surface of back-up roll 54. In addition, horn support apparatus 18 is configured to retract support rolls 56A, 56B from contact with the outer surface of horn 20, at desirable stages of a bonding operation.

For example, when no active bonding operation is being performed, rotation of horn 20 is typically stopped. To the extent rolls 54, 56A, 56B remain in forced engaging contact with horn 20, flat spots develop on outer surface 42 of the horn. Such flat spots are expressed in subsequent bond formation in the form of loci of deviation from the desired consistency of bond development. Such flat spots also tend to impose stress on ultrasonic horn 20, thereby contributing to wear of the horn, as well as cracking and failures of horn 20. Therefore, it is desirable to remove all supporting contact from horn surface 42 at any time the horn ceases to rotate. Such removal of surface support contact is effected by withdrawing rolls 56A, 56B. from the sides of horn 20, whereupon the weight of the horn causes the horn to sag by gravity, away from, and out of contact with, back-up roll 54.

As representatively illustrated in the drawings, in this invention, ultrasonic horn 20 is mounted above anvil roll 16. Horn support assembly 58 is provided to retract support rolls 56A, 56B from contact with outer peripheral bonding surface 42 of horn 20.

As representatively illustrated in FIGS. 1, 2, 4, and 5, horn 20 is configured to rotate about horn axis 44 in the direction indicated by arrow 46 associated therewith. Horn 20 can be connected to a shaft 76 by suitable means such as by using a continuous one-piece design, or studs, or other known means of suitable attachment of a horn to a shaft. Other rotating components of horn support apparatus 18 can be similarly connected to each other as desired, to rotate in common with each other. Horn 20 is accordingly connected to frame 12 through horn support apparatus 18.

In general, conventional ultrasonic excitation crystals (piezoelectric crystals) are operationally connected to horn 20 through suitable amplifier and wave guide structure 61, so as to implement radially-directed ultrasonic vibrations in annular horn 20. Amplifier and wave guide structure 61 also functions as a portion of shaft 76 supporting the horn. Rotary horn 20 is generally disc-shaped although the precise outer configuration of the horn varies considerably from horn to horn in accord with other horn variables.

As representatively illustrated in FIGS. 1, 2, and 4, horn 20 generally comprises a shaped metal object. Representative examples of rotary ultrasonic horns which can be used in the present invention are described in U.S. Pat. No. 5,096,532 to Neuwirth et al and U.S. Pat. No. 5,110,403 to Ehlert, both of which are herein incorporated by reference in their entireties. In general, rotary ultrasonic horn 20 can be made from any metal having suitable acoustical and mechanical properties. Suitable metals include aluminum, monel, titanium, and some alloy steels. Titanium is preferred for its overall combination of desirable properties. In general, variables such as diameter, mass, width, thickness, and configuration of the rotary ultrasonic horn can be varied within substantial ranges. However, such variables, along with composition of the horn, do determine the particular frequency and amplitude at which a particular rotary ultrasonic horn resonates, which can affect bond quality and consistency. In particular, diameter, width, and thickness of the horn are selected such that the horn, upon being excited by ultrasonic energy at a desired frequency, is adapted to resonate such that the excited end moves substantially in phase with movement of the excitation source, and the bonding surface 42 also moves in a suitable pattern which is directed generally perpendicular to annular bonding surface 42 of the horn.

Typically, ultrasonically induced movements of the opposite ends of the horn relative to each other may be out of phase. For example, the rotary ultrasonic horn illustrated in the drawings can be excited at a frequency of from about 18 kHz to about 60 kHz. Horn 20 typically has a diameter of from about 4 centimeters to about 18 centimeters. Thickness of the horn at rotational axis 44 is typically from about 0.6 centimeters to about 15 centimeters. The horn can have a mass in the range of from about 0.06 kilograms to about 30 kilograms.

Horn support apparatus 18 includes a drive mechanism 60 which rotates and ultrasonically excites horn 20. Drive mechanism 60 can include the above noted piezoelectric crystals, the amplifier, and part or all of the wave guide. Any mechanism which provides the desired rotation and ultrasonic excitation can be used in the present invention. Such mechanisms are well known to those skilled in the art.

For example, drive mechanism 60 can be a mechanism commercially available from Dukane Corporation, St. Charles, Ill. or a similar system available from Branson Sonic Power Company, Danbury, Conn. Namely, a generator such as a Dukane 1800 watt, 20 kHz generator (Part No. 20A1800), is connected to a drive assembly, such as a Dukane drive assembly (Part No. 110-3123), to provide the necessary ultrasonic excitation. Any combination of boosters, such as a Dukane 1:1 booster (Part No. 2177T) and a Dukane 2:1 booster (Part No. 2181T), may then be attached to the drive assembly. Finally, rotary ultrasonic horn 20 of the present invention is attached to the boosters. Thus, the combination of generator, drive assembly, and boosters, functioning as drive mechanisms 60, rotates and ultrasonically excites rotary ultrasonic horn 20 thereby providing the ultrasonic energy and rotational motion necessary to bond workpiece segments 24, 34, or workpiece segment 24 and discrete elements, to each other under suitable nip pressure.

Addressing now the support of the horn as illustrated in the drawings, horn 20, along with drive mechanism 60, is generally supported in a cantilevered arrangement, on e.g. rubber O-rings 74 (FIG. 5) disposed about shaft 76. The O-rings support both the horn and the drive mechanism from shaft support structure (not shown). Given the weight of horn 20, along with the weight of the drive mechanism, when the weight of the horn and drive mechanism are fully supported by only the O-rings, the weight of the combination of the horn and drive mechanism compresses the resilient O-rings, whereby the horn sags out of true alignment with the shaft support structure which supports shaft 76, the horn, and the drive mechanism. At full sag, and assuming no change in other roll support structure positionings, a horn weighing e.g. twenty pounds moves a distance of e.g. about 0.015 inch away from back-up roll 54.

Support rolls 56A, 56B can be spaced around horn 20 in any manner which supports horn 20 in a substantially fixed position during bonding operations, and a position to which horn 20 can be repeatedly returned. Back-up roll 54 preferably engages horn 20 opposite anvil roll 16, thus to provide straight, in-line back-up support to horn 20 through axis 44, whereby horn 20 can be relatively rigidly supported against the upward force exerted by anvil roll 16 against horn 20 while avoiding harmful bending stresses on shaft 76 and compressing forces on O-rings 74, thereby to develop bonding forces in nip 22.

Back-up roll 54, and support rolls 56A, 56B can be made from any suitable material capable of holding horn 20 in a substantially fixed position. Exemplary materials for rolls 54, 56A, 56B include metal such as steel and alloys of other metals, rubber, urethane, and other durable materials capable of withstanding the pressure and ultrasonic energy environments imposed on the respective rolls. In one embodiment, rolls 54, 56A, 56B are configured to contact bonding surface 42 of horn 20. Desirably, the support rolls, through frictional engagement with horn 20, rotate with the horn to effectively support the horn without adversely affecting rotation or ultrasonic vibration of the horn. Rolls 56A, 56B can include ball bearings as supports for the rolls, can comprise bearings per se, or can comprise idler rolls, as are known to those skilled in the art, configured to contact bonding surface 42 of horn 20.

Referring to FIGS. 2 and 4, horn support apparatus 18 comprises a horn support plate 78. Support roll guide mechanism 80 includes upstanding first and second lever arms 82A, 82B mounted for pivotation with respect to plate 78 at pivot anchors 84A, 84B. Support arms 85A, 85B extend from lever arms 82A, 82B at pivot anchors 84A, 84B respectively, and move in unison with the respective lever arms, to move rolls 56A, 56B into and out of engagement with outer surface 42 of horn 20. Power cylinder 86 extends between lever arms 82A and 82B, and is mounted for pivotation with respect to lever arms 82A, 82B at pivot pins 88A, 88B, and provides the motive power moving the lever arms toward and away form each other. Cylinder 86 can be e.g. an air cylinder or an hydraulic cylinder. However, an air cylinder is preferred because of the ability of compressed air in the cylinder to absorb, better than hydraulic fluid, shock forces which may be imposed on the system.

Bearing race 90 is rigidly mounted to horn support plate 78 and includes ball tracks 92 (FIG. 2). Linear bearing top-mounting plate 94 includes a linear bearing 95 including ball bearings (not shown) which run in ball tracks 92, whereby linear bearing top-mounting plate 94 slides up and down on bearing race 90. Equalizer arm 96A is pivotally mounted to lever arm 82A at pivot pin 98A and is pivotally mounted to linear bearing top-mounting plate 94 at pivot pin 100A. Equalizer arm 96B is pivotally mounted to lever arm 82B at pivot pin 98B and is pivotally mounted to linear bearing top-mounting plate 94 at pivot pin 100B. Since linear bearing top-mounting plate 94 can travel only upward and downward on bearing race 90, equalizer arms 96A, 96B, in combination, control the movement of lever arms 82A, 82B such that the lever arms are forced to move equal distances inward or outward upon activation of power cylinder 86. Correspondingly, support arms 85A, 85B are forced to move equal distances inward or outward, toward or away from horn 20, upon activation of power cylinder 86. Thus, providing for corresponding set-up, when power cylinder 86 is extended, support arms 85A, 85B move predictably equal distances toward horn 20, whereby support rolls 56A, 56B support ultrasonic horn 20 at a known location in space each time the support rolls engage the horn.

Since rolls 56A, 56B are below axis 44 of cylindrical horn 20, movement of the support arms inwardly into contact with horn 20 provides a lifting vector lifting the horn upwardly. Depending on the distance by which the support rolls lift the horn, support arms 85A, 85B can preferably bring horn surface 42 into surface engagement with back-up roll 54.

Back-up roll 54 is supported by cradle arm 112 connected to horn support assembly 58. Horn support assembly 58 additionally includes mounting bracket 102 rigidly mounted to support plate 78 at e.g. bolts 104. Spring mounting plate 106 is rigidly mounted to support plate 78 by bolts 108. Similarly, adjustment mounting plate 110 is rigidly mounted to support plate 78. Spring 118 is disposed between cradle arm 112 and spring mounting plate 106.

As illustrated in FIG. 2, horn support assembly 58 includes cradle arm 112 and back-up roll 54. Cradle arm 112 includes cradle 113 which extends on both sides of back-up roll 54. Back-up roll 54 is mounted to cradle 113 between equivalent bearings 114 which are on opposing sides of roll 54. Using bearings 114 on opposing sides of back-up roll 54, assuming that the axes of rotation of horn 20 and back-up roll 54 are substantially aligned, and directing back-up forces through axes 44 and 50, urges back-up roll 54 to apply back-up forces in alignment with the axes of both horn 20 and back-up roll 54, thereby avoiding back-up roll 54 applying cantilevered back-up forces. Cradle arm 112 is mounted for pivotation with respect to mounting bracket 102 at pivot pin 116, and extends from mounting bracket 102 to spring mounting plate 106.

Accordingly, when properly set up with the axes of the horn, the back-up roll, and anvil roll 16, substantially aligned with each other, the pressure applied by the outer working surface of back-up roll 54 to outer bonding surface 42 of the horn influences the spacial orientation of the outer bonding surface of the horn to track parallel to outer working surface 64 of anvil roll 16, such that the outer bonding surface of horn 20 can more closely track the incoming and outgoing portions of path 36 traversed by workpiece segment 24, with only minimal deviation of bonding surface 42 from the path in accord with pressure applied at nip 22.

Cradle arm 112 is mounted on top of compression spring 118. A load cell 120 is disposed above cradle arm 112, at the spring end of the cradle arm. Above load cell 120, adjusting block 122 is rigidly mounted to adjustment mounting plate 110. Adjustment screw 124 extends through threaded adjusting block 122 and abuts load cell 120. Adjusting wheel 126 is secured to adjusting screw 124. Adjusting wheel 126 turns screw 124 and thus effectively raises or lowers the lower end of the adjusting screw and correspondingly load cell 120, and the corresponding end of cradle arm 112. Thus, by turning an adjustment device such as adjusting wheel 126, one can pivot the back-up roll with respect to support plate 78 at pivot pin 116, thereby raising or lowering back-up wheel 54 with respect to horn 20.

Spring 118 keeps load cell 120, disposed on cradle arm 112, in contact with adjusting screw 124 when support rolls 56A, 56B are retracted. Keeping load cell 120 in contact with adjusting screw 124 when support rolls 56A, 56B are retracted provides a mechanism to ensure that back-up roll 54 does not drop down and establish contact with horn 20, when the machine is stopped, but horn 20 is vibrating. Adjusting block 122 and adjusting screw 124 bear against cradle arm 112 through load cell 120 thus to control the positioning of back-up roll 54 against horn 20. Adjusting screw 124 extends through adjusting block 122 and interfaces with load cell 120 mounted on the top surface of cradle arm 112. A programmable logic controller 119 is connected to the load cell by information connection/relay apparatus 121 such as a wire capable of carrying signals between the load cell and the programmable logic controller. The programmable logic controller connects to servo motor 127 through means of information connection/relay apparatus 123 such as a wire capable of carrying signals between the programmable logic controller and the adjustor. Load cell 120 emits signals in response to force applied to load cell 120 from cradle arm 112. The signals from load cell 120 are conducted by information connection apparatus 121 to programmable logic controller 119, wherein the signals are interpreted, and programmable logic controller 119 emits response signals through information connection apparatus 123 to servo motor 127. Adjusting screw 124 is adjusted as a result of activating servo motor 127 through linking belt 125, to make fine adjustments to the force being exerted by horn 20 on the anvil roll at nip 22 (FIG. 5) through back-up roll 54, thus to provide fine adjustment of the load being exerted on anvil roll 16 at the nip, especially in response to force expressed against the ultrasonic horn by raised portion 70 of the anvil roll in the nip (FIG. 4).

In general, support roll guide mechanism 80 controls movement of support rolls 56A, 56B into and out of support of horn 20; and horn support assembly 58, via cradle arm 112, acting as a closure apparatus in some embodiments, controls the base-line location of back-up roll 54 relative to horn 20. The use of load cell 120 provides a mechanism to measure the nip force between ultrasonic horn 20 and rotary anvil roll 16.

As representatively illustrated in the drawings, anvil roll 16 is configured to rotate about anvil axis 50, and to press substrate workpiece segment 24, optionally along with a second element or workpiece segment 34 to be bonded thereto, against bonding surface 42 of the ultrasonic horn. The anvil roll is connected to a shaft 62 (FIG. 5) which is rotatably mounted and connected, as part of anvil support apparatus 14, to frame 12, by any suitable means such as conventional bearings. In general, anvil roll 16 can be made from any metal having suitable mechanical properties for tolerating the use environment, and the function of urging the materials to be bonded into bonding engagement with surface 42 of the ultrasonic horn. Suitable metals include, for example and without limitation, certain of the alloy steels.

Typically, anvil roll 16 has a width 66 of about 0.6 centimeter to about 50 centimeters, desirably from about 0.6 centimeter to about 15 centimeters. Operating surface 64 is configured to bond the workpiece segments 24, 34, or a workplace segment 24 and discrete elements, to each other at bond locations arranged in a predetermined bond pattern on operating surface 64. For example, as representatively illustrated in FIG. 6, anvil surface 64 of anvil roll 16 can have an array 67 of projections 68 thereon. The array of projections 68 can extend completely around the circumference of operating surface 64, and across the entirety of the transverse width of operating surface 64, thereby to cover substantially the entirety of the operating surface of the anvil roll.

Figure 6:
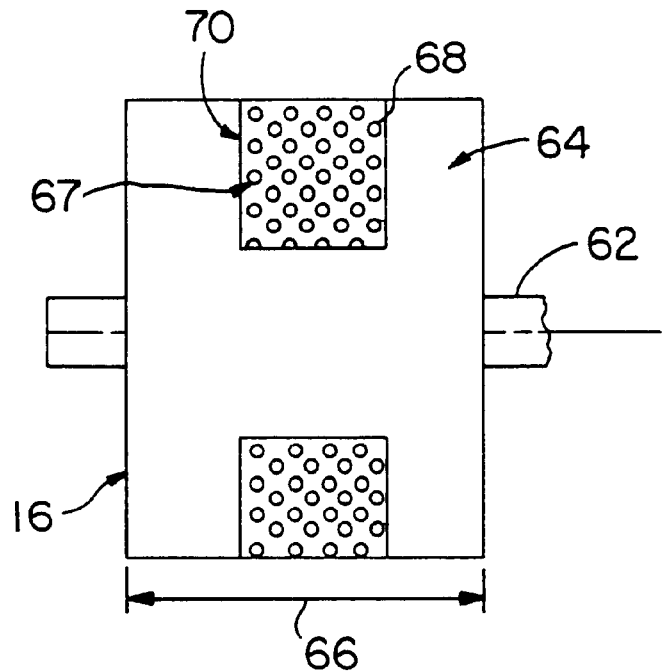
FIG. 6 shows a representative example of an anvil roll useful in the invention, including first and second bonding regions.

In the alternative, projections 68 can be disposed, as shown in FIGS. 3, 6, in discrete spaced arrays which cover portions but not all of either or both of the circumference or width of the operating surface, of anvil roll 16.

Where an overall pattern is used, the projections suggest continuous bonding force being applied by anvil roll 16 against horn 20. To the extent suitable workpiece segment or other material is in the nip between the horn and anvil, the continuous array provides for creating a continuous bond along the corresponding length of the workpiece segment over substantially the entirety of the width of the nip.

Breaks in the array of projections, whether partial or full width, can result in bonds intentionally being developed over less than the entirety of the area of the material passing through the nip. Namely, the extent to which bonds are developed in nip 22, across the width of the workpiece segment, depends on the degree to which the array of projections 68 or other elements extend across the width of the workpiece segment. The pattern of projections about the circumference of the anvil generally controls the longitudinal arrangement of the bond pattern which can potentially be developed on the materials passing through the nip.

Projections 68 can be any size or shape, any orientation or distribution, depending on the bond pattern desired for the material passing through the nip. A preferred, but not limiting bond pattern, is represented by about 30 percent bond area and about 70 percent non-bond area.

Figure 6A:
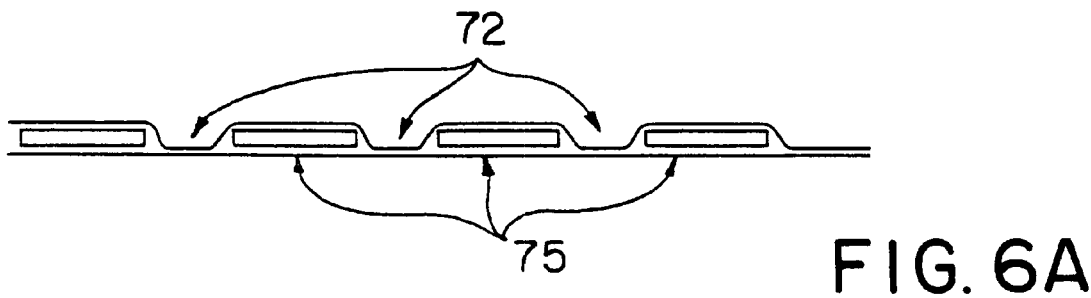
FIG. 6A shows a representative side elevation view of a composite substrate web which can be manufactured using apparatus and methods of the present invention.

In preferred embodiments especially of interest in this invention, surface 64 of anvil roll includes a raised portion 70, also known as a "bump," illustrated in FIGS. 1, 3, and 4. In such embodiments, the array or arrays of projections are disposed on the raise portion or raised portions. Raised portion 70 is particularly useful when one of workpiece segments 24, 34, or workpiece segment 24 and discrete elements to be bonded thereto, have varying thicknesses as illustrated in FIG. 6A. The principle of raised portion 70 is to provide a first larger radius portion of the anvil roll at 70 for providing bonding activity at thinner portions 72 of the workpiece segment, and to provide a second relatively smaller radius portion 73 of the anvil roll. The second smaller radius portion of the anvil roll provides clearance between the anvil roll and the horn for passage of thicker portions 75 of the workpiece segment between the anvil roll and the horn. In some embodiments, the first larger radius is about 0.01 inch to about 0.07 inch greater than the second smaller radius.

Rotation of the anvil roll can be timed such that raised portion 70 of anvil roll surface 64 presses thinner portions 72 (FIG. 6A) of workpiece segments 24, 34 against bonding surface 42 of horn 20 with sufficient force to develop ultrasonic bonds at thinner portions 72 while thicker portions 75 of the workpiece segment pass through the nip at the smaller radius portions 73 of the anvil roll. Typical of such thicker portions of the workpiece segment are absorbent pads such as are used in disposable diapers, feminine hygiene pads, and the like.

Such timing of activation of the ultrasonic bonding can be beneficial to establishing and maintaining desirable levels of interference between bonding surface 42 and surface 64 of the anvil roll at the raised portions, while enabling the thicker portions of the workpiece segment or other workplace to pass through the nip without being crushed.

When raised portion 70 passes into and through nip 22, the presence of the raised portion in combination with the planned interference between the raised portion and the horn, imposes a relatively increased level of stress on both the horn and the anvil in order to provide suitable force at the nip to develop ultrasonic bonds using the ultrasonic energy being expressed in horn 20. Correspondingly, when raised portion 70 is not in the nip, namely when a smaller radius portion 73 is in the nip, the nip force, if any, is substantially less than that required to form ultrasonic bonds. Thus, as the anvil and the horn rotate in an ongoing bonding process, raised portion 70 repeatedly passes into and out of the nip, repeatedly stressing both the anvil support structure and the horn structure, as well as frame 12 onto which are mounted both the anvil support structure and the horn support structure.

Each introduction of increased stress includes both passive loading and impact loading. Particularly the impact loading can introduce significant variation in effective load along the machine direction length of the bonding surface defined by raised portion 70, due to reflex reaction of the respective support structures. As a result, bond strength can vary longitudinally along the length of an array of bond elements represented by the length of raised portion 70, and in some instances can vary along the width of such array.

For example, when anvil roll 16 is sufficiently loaded against horn 20 to develop ultrasonic bonds, as raised portion 70 enters the nip, the impact of the leading edge of the raised portion meeting the horn causes sufficient reactive relative movement of one or both of the horn or anvil roll away from the nip, as a "bounce," that the effective load in the nip directly downstream of the leading edge of raised portion 70 is less than the effective load at the leading edge or at the trailing edge of the raised portion.

Where the dead load applied by the anvil has been set for optimum ultrasonic bonding, the reduced load directly downstream of the leading edge of raised portion 70 results in less than optimum bonding, while desired bonding can be achieved elsewhere on the raised portion. If the dead load applied by the anvil is increased such that optimum bonding is achieved directly downstream of the leading edge in spite of the bounce, then optimum bonds may be achieved directly downstream of the leading edge, while the excessive loading elsewhere on raised portion 70 results in inferior bonds and may result in damage to the materials being bonded.

The force applied by anvil roll 16 at raised portion 70, against horn 20, is supported from frame 12 through anvil support apparatus 14. Referring to FIG. 3, anvil support apparatus 14 includes the rotating anvil roll 16 as an anvil supported adjacent and below path 36 of workpiece segment 24. Anvil roll 16 includes outer peripheral working surface 64, which includes raised portion 70 and smaller radius portion 73. Raised portion 70 contacts workpiece segment 24 and, in combination with horn 20, acts upon workpiece segment 24 in nip 22 to develop ultrasonic bonds while the anvil roll rotates about anvil roll axis 50 (FIG. 4) in the direction indicated by arrow 52.

Anvil support apparatus 14 includes anvil loading assembly 128. Anvil loading assembly 128 includes anvil lifting plate 130, anvil loading pivot plate 132, anvil bottom support plate 134, load transmission assembly 136, air bladder 138. stop cylinder 140, and longitudinal support plate 142.

For purposes of illustration, anvil lifting plate 130 is shown mounted to right side plate 32 of frame 12 in FIG. 1, and slides upwardly and downwardly with respect to right side plate 32 as indicated by the double-headed arrow 144, thereby to provide coarse up and down movements of the anvil loading assembly with respect to right side plate 32.

In preferred embodiments, anvil lifting plate 130 is mounted to left side plate 30 such that loading transmission assembly 136 and arms 152A, 152B are trailing arms, rather than leading arms, with relationship to the substrate path indicated by directional arrow 38 (FIG. 1). A trailing arm relationship of arms 152A, 152B tends to track the substrate path more effectively than the leading arm relationship illustrated between FIGS. 1 and 3. In the illustrated embodiments, all other elements of anvil support apparatus 14 are mounted directly or indirectly to lifting plate 130. Lifting plate 130 is beneficial in that lifting plate 130 allows for the interchanging of different size anvils to accommodate the production of different size products. For example, if the anvil is a function roll and makes one revolution per product, the anvil roll circumference and thus anvil roll diameter must change as product length changes.

Pivot plate 132 is mounted to lifting plate 130 and pivots about lifting plate 130 at pivot pin shoulder bolt 146. Pivot plate 132 pivots about pivot pin shoulder bolt 146 to bring raised portion 70 into a parallel relationship with bonding surface 42 of horn 20. Spring block 148 is mounted to lifting plate 130. Spring 150 is located and provides relationship between spring block 148 and pivot block 132. Pivot plate 132 is pivoted about pivot pin shoulder bolt 146 by extending and retracting a shaft (not shown), located on the far of side of pivot plate 132, with respect to spring block 148.

Bottom support plate 134 extends outwardly from, and is rigidly mounted e.g. by welding or bolting, to lifting plate 130. Support plate 134 provides a rigid platform for receiving and supporting air bladder 138, and for receiving and transferring the supported force/load from bladder 138 to lifting plate 130 and load transmission assembly 136, thus allowing air bladder 138 to function as a closure apparatus adapted for bringing the anvil roll into contact with the ultrasonic horn with sufficient closure force between the horn and the anvil roll to form an effective ultrasonic bonding nip.

Load transmission assembly 136 includes first and second load arms 152A, 152B mounted to pivot plate 132 at e.g. pivot shaft 154, for cooperative pivotation of arms 152A, 152B about pivot shaft 154, thus to pivot the load transmission assembly about pivot plate 132.

Load transmission assembly 136 further includes transverse brace plate 156 which is rigidly mounted to load arms 152A, 152B, and accordingly connects, load arms 152A, 152B to each other, such that load arms 152A, 152B, and brace plate 156 move and otherwise act in unison as a unitary body.

Load transmission assembly 136 further includes cross tube 158 which extends between and is rigidly mounted to load arms 152A, 152B, and is also rigidly mounted to brace plate 156, so as to coact with load arms 152A, 152B, and brace plate 156. Further, bottom plate 160 is rigidly attached to brace plate 156 and to load arm 152B at bottom edges of the respective load arm and brace plate. Bottom plate 160 serves as an interface between the load transmission assembly and air bladder 138.

Figure 3A:
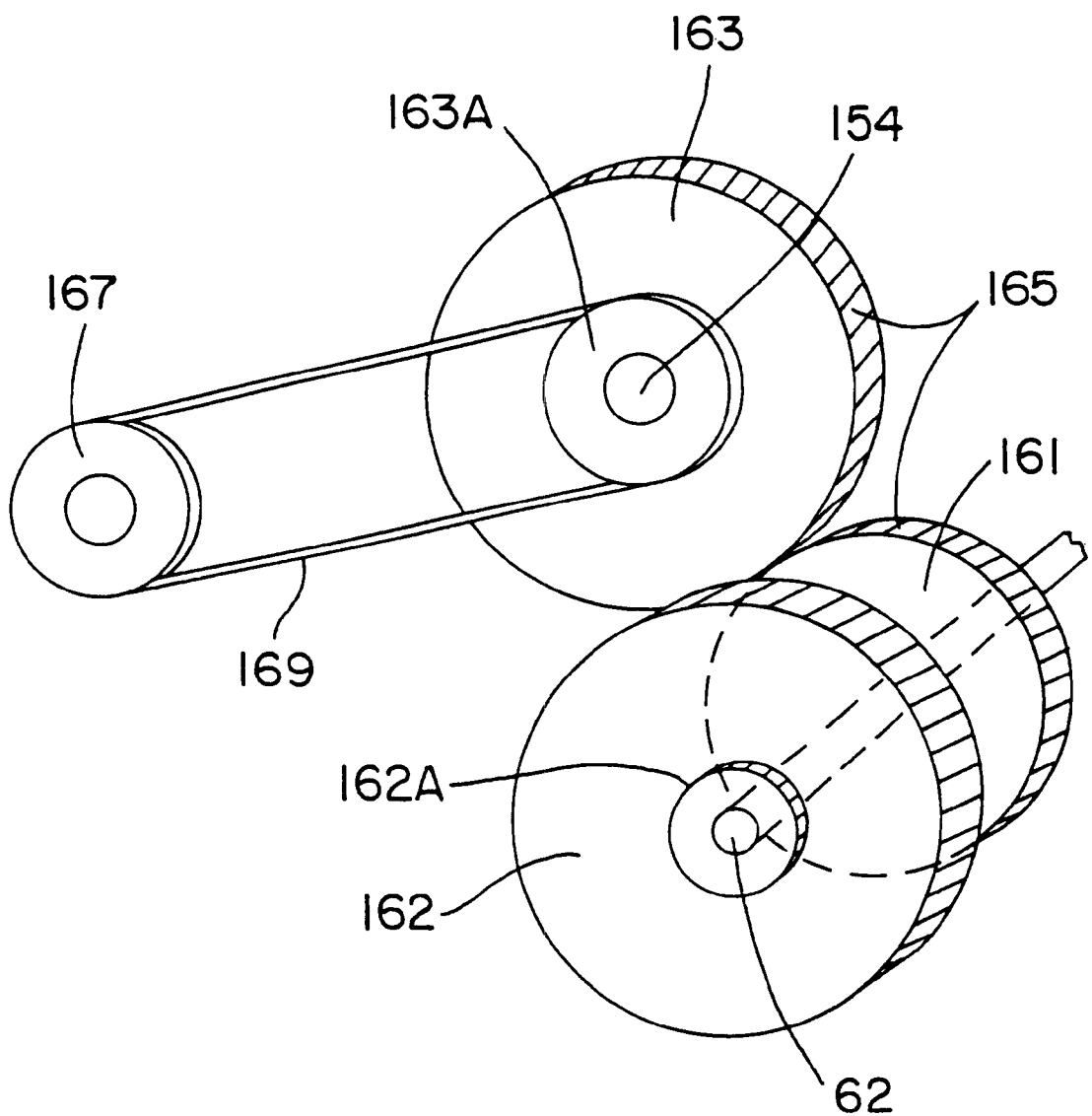
FIG. 3A shows a pictorial relational view of the gears of the anvil support apparatus illustrated in FIG. 3.

Load transmission assembly 136 also includes the above discussed anvil roll 16, including raised portion 70 and smaller radius portion 73. The anvil roll is mounted through anvil shaft 62 to load arms 152A, 152B, preferably through bearings (not shown) at each of the load arms. Anvil shaft 62 extends through cross tube 158 between load arms 152A, 152B. Shaft 62 is visible outside the outer surface of load arm 152A. As illustrated in FIG. 3A, shaft 62 is connected to and rotates with drive gear 162, harmonic phasing unit 162A, and drive gear 161, drive gear 161 being hidden behind drive gear 162 in FIG. 3, but shown in FIG. 3A. Accordingly, anvil 16 rotates in unison with drive gears 161, and 162, and, due to the affect of harmonic phase adjuster 162A, drive gear 162 can precess relative to anvil 16. Harmonic phase adjuster 162A can be, for example, an Infinit-Indexer® Phase Adjuster commercially available from Harmonic Drive® of Quincy Technologies, Inc., Wakefield, Massachusetts, or any other functionally similar mechanism.

Drive gear 163 is connected to drive pulley 163A and driven by timing belt 169 which is connected to input drive pulley 167. Gear 163 drives gear 161, which is shown disposed behind gear 162 in FIG. 3A. Drive gear 161 interacts via meshing teeth 165 with drive gear 163 to rotate anvil roll 16. Harmonic phasing unit 162A is keyed to shaft 62, and, in addition, is affixed to gear 162. Gear 162 connects to, and drives, a gear (not shown) which is connected to the horn assembly, whereby anvil roll 16 and horn 20 rotate cooperatively in combination with the passage of workpiece segment 24 et al through nip 22. The use of harmonic phase adjuster 162A enables the rotation of the horn to not be rigidly geared to the rotation of the anvil roll, but enables the horn to drift slightly such that the pattern of the pins on the anvil roll does not ride on and, thusly, wear grooves in the same respective locations of the horn.

The primary lifting force on anvil roll 16 is transmitted from lifting plate 130 through bottom support plate 134, through bladder 138, through load transmission assembly 136, and thence to anvil roll 16. Bladder 138 also serves as a shock absorber to receive and dissipate load shocks, e.g. impact load shocks, imposed on the load transmission assembly through anvil 16, especially at raised portion 70. In preferred embodiments, bladder 138 applies a lifting load of about 300 pounds on load cell 176. The respective e.g. 300 pound load registers at face value at load cell 176. To the extent some or all of the respective load is transferred to horn 20 through anvil 16, the load registering on load cell 176 is correspondingly reduced. Correspondingly, any load transferred from anvil roll 16 to horn 20 is registered as an additional load increment at load cell 120. Thus either load cell can be used to monitor and ultimately control the force in the nip 22 between ultrasonic horn 20 and the rotary anvil roll 16.

The amount of lifting force applied by bladder 138 should be sufficient to provide relative stability to anvil roll 16, while enabling the anvil roll to move away from the nip in the event an excess load is generated at the nip.

Longitudinal support plate 142 is rigidly mounted e.g. by welding or bolting to lifting plate 130. Support plate 142 serves as a stabilizing element and as a link between side plates 30, 32 of frame 12. In that regard, lifting plate 130 is rigidly mounted to side plate 32 (FIG. 1), and a bolt (not shown) extends through slot 164 of the support plate and secures support plate 142 to side plate 30. Such securement to side plate 30 is loosened for sliding lifting plate 130 upwardly or downwardly, depending on the size of the anvil, with respect to side plates 30, 32, and is then tightened to hold the support plate rigidly to side plate 30 at the selected elevation during routine use of the bonding apparatus.

Stop cylinder support bracket 166 is rigidly mounted to support plate 142 as by welding or bolting, and rigidly supports stop cylinder 140. Cylinder 140 includes extension rod end block 168 which extends toward, and is in alignment with, lower surface 170 of load arm 152B. Rod end block 168 can be extended or retracted to establish the lowest enabled point of travel of load transmission assembly 136 as lifting plate 130 is moved downwardly to lower anvil roll 16 away from horn 20. By establishing the lower limit of travel of load transmission assembly 136 at a height wherein gear 162 and the gear (not shown) driving the horn remain engaged. Disengagement of the anvil roll from the horn does not disengage the lower drive gears from the upper drive gears.

During routine operation of the bonding process, rod end block 168 is displaced somewhat downwardly from lower surface 170 of load arm 152B. Rod end block 168 can be raised or lowered routinely to adjust the desired lowest height of load arm 152B, and thus the lowest height of load transmission assembly 136 with respect to lifting plate 130.

Support bracket 172 is mounted to the top surface of longitudinal support plate 142. Adjusting screw 174 extends through support bracket 172 and interfaces with a load cell 176 mounted on the top surface of load arm 152B. A programmable logic controller 171 is connected to the load cell by information connection/relay apparatus 177 such as a wire capable of carrying signals between the load cell and the programmable logic controller. The programmable logic controller connects to servo motor 178 by information connection/relay apparatus 179 such as a wire capable of carrying signals between programmable logic controller 171 and servo motor 178. Load cell 176 emits signals in response to forces applied to load cell 176 by load arm 152B. The signals from load cell 176 are conducted by information connection apparatus 177 to programmable logic controller 171, wherein the signals are interpreted, and programmable logic controller 171 emits response signals through information connection apparatus 179 to servo motor 178. Adjusting screw 174 is adjusted as a result of activating servo motor 178 through linking chain 180, to make fine adjustments to the force being exerted by anvil roll 16 on horn 20, thus to provide fine adjustment of the load being exerted on horn 20 by especially raised portion 70 of the anvil roll.

The present invention addresses the problem of consistency of the load or force/pressure being exerted on the workpiece segment by the horn and the anvil at nip 22 when the raised portion of the anvil is in nip 22. First, support surfaces 54, 56A, 56B are provided for fixing the position of the horn with respect to frame 12 during the bonding operation, and wherein any cantilever elements of the force vectors are canceled by opposing force vectors, whereby cantilever vectors have little or no effect on positioning of horn 20. Second, the collective rigidity, stiffness, of bonding apparatus 10 is increased in order to reduce the amount of interference, between horn 20 and anvil roll 16, which is required in order to achieve the needed nip load to ultrasonically generate bonds having satisfactory bond strength.

The compositions of workpiece segments 24 and/or 34 can be any materials known to those skilled in the art which are compatible with development of ultrasonic bonds.

For example, workpiece segments 24, 34 can include one or more nonwoven materials such as spunbond, melt blown, spun laced or carded polymeric materials, a film material such as a polyolefin, for example polyethylenes and/or polypropylenes, or a polyurethane film, a foam material, or combinations of the above recited materials.

For purposes of the present description, "nonwoven workpiece segment" means a fibrous web of material which is formed of fibers without aid of a textile weaving or knitting process. Workpiece segments 24, 34 may be elastic or non-elastic such as films or layers of natural rubber, synthetic rubber or thermoplastic elastomeric polymers.

Typical workpiece segments bonded using the invention have thicknesses of about 0.0005 inch to about 0.25 inch at bonding loci, and may have greater or lesser thicknesses at loci of the workpiece segment which are not being so bonded.

As used herein, the terms "elastomeric" or "elastic" refer to any material which can be elongated or stretched in a specified direction from about 20 percent to at least about 400 percent by application of a biasing force and which recovers to within about 35 percent of its original length after being subsequently released from the biasing force after a short-term duration of the stretched condition.

Workpiece segments 24, 34 can be made from a common material or can be made from different materials. In some embodiments, at least one of the workpiece segments is made from resiliently stretchable material such as stretch-bonded-laminate (SBL) material, neck-bonded laminate (NBL) material, elastomeric film, elastomeric foam, or like resiliently stretchable materials as are well known to those skilled in the art.

The bonding resulting from application of ultrasonic energy can result from partial or complete melting of materials in one or both of workpiece segments 24 or 34, or partial or complete melting of material in a corresponding element being applied to a respective workpiece segment. Bonding can result from partial or complete melting of material of only one of the elements being acted upon, with the activated material interacting with the corresponding adjacent workpiece segment or element which in turn results in mechanical interlocking of the elements/workpiece segments to each other.

In the alternative, bonding can result in mutual partial or complete melting of materials of both the elements being acted upon, with flow and/or other interaction between or among the respective materials of both elements which results in a bonding better represented as adhesive bonding or cohesive bonding, optionally in combination with the above-recited mechanical interlocking of components of one or both of the respective elements to each other.

Figure 5:
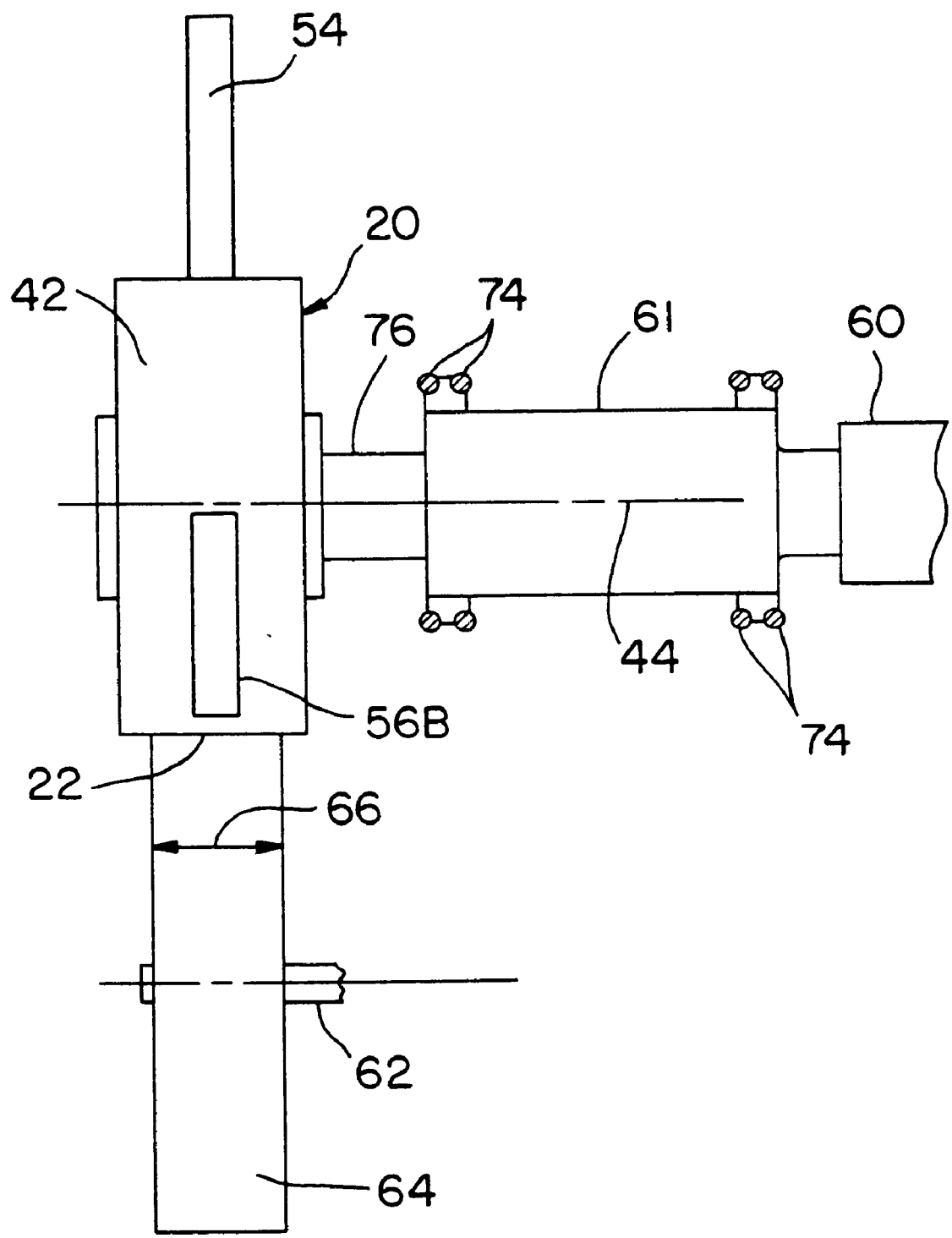
FIG. 5 shows a representative side elevation view of the apparatus illustrated in FIG. 4.

In some embodiments of the invention, portions of continuously moving workpiece segments 24, 34 are both softened and/or melted using ultrasonic energy supplied to the rotary ultrasonic horn, along with sufficient pressure to activate the materials in the respective workpiece segments, whereby the workpiece segments are thus bonded to each other through simultaneous application of ultrasonic energy and pressure. In such a configuration, anvil roll 16 is configured to rotate about anvil axis 50 and to press workpiece segments 24, 34 against the outer peripheral bonding surface of ultrasonic horn 20 e.g. at raised portion 70 thereby bonding the workpiece segments to each other. As illustrated in FIGS. 2, 4, and 5, support rolls 56A, 56B are configured to contact outer bonding surface 42 of horn 20 to hold horn 20 in a substantially fixed location while the support rolls are engagingly supporting horn 20.

When ultrasonic vibration of a rotary ultrasonic horn is commenced, the energy passing through the horn causes the temperature of the horn to rise. As the temperature of the horn rises, the size, including the diameter, of the horn changes. As the diameter of the horn changes, the inferred interference changes, as does the corresponding nip pressure, and the resonant frequency. As the nip pressure changes, bond quality changes. In order to avoid the above changes of processing parameters, it is common to leave the horn energized, though not rotating, even when the horn is not being used, so that the operator need not deal with size changes as a process variable.

With the horn energized but not rotating, any substantial object disposed against outer working surface 42 of the stationary horn can cause development of a flat spot on the horn surface at the locus of touching. Accordingly, it is important that all support of horn 20 at surface 42 be withdrawn when the horn is not rotating. Such withdrawal of horn support has both operational and structural implications. Operationally, the programmable logic computer (not shown) which controls operation of the system, is programmed to automatically withdraw support rolls 56A, 56B from surface 42 any time rotation of horn 20 is stopped. Structurally, horn 20 is intentionally positioned below back-up roll 54 such that, when rolls 56A, 56B are withdrawn, the weight of horn 20 causes the horn to sag away from back-up roll 54, along with corresponding compression of O-rings 74. For an exemplary horn approximately 6 inches diameter, three inches thick, the horn typically sags about 0.010 inch to about 0.025 inch away from back-up roll 54.

Withdrawing support rolls 56A, 56B causes ultrasonic horn 20 to sag and come out of contact with back-up roll 54 e.g. at the end of a bonding project, and re-engaging support rolls 56A, 56B, lifting ultrasonic horn 20 into contact with the back-up roll at initiation of a subsequent project, returns the ultrasonic horn to the same defined location. The disengagement of support rolls 56A, 56B and subsequent resultant sagging of ultrasonic horn 20 away from back-up roll 54 allows the horn to continue vibrating with other portions of the machine stopped. The continued vibration of the horn keeps the diameter of the ultrasonic horn constant, since ultrasonic horns tend to demonstrate thermal expansion during operation.

Figure 7:
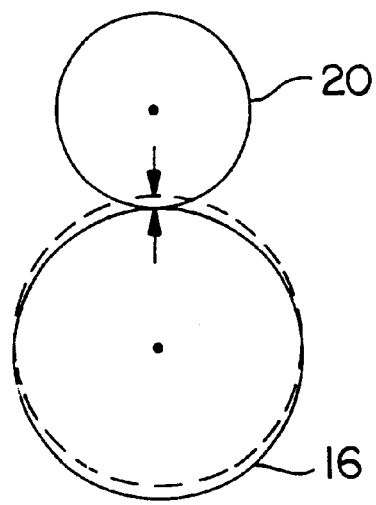
FIG. 7 shows a side elevation representation of the anvil roll and the horn, illustrating the inferred interference between the horn and anvil.

Referring now to FIG. 7, the actual touching contact is illustrated in solid outline while the dashed outline of anvil roll 16 illustrates the position that would be occupied by anvil roll 16 in the absence of the interference with horn 20. Thus the dashed outline illustrates the amount of interference inferred by the settings of e.g. adjusting wheel 126 and/or adjusting screw 174.

As used herein, "interference" is measured by first fixing the horn in its bonding position, with support rolls 56A, 56B supporting horn 20 against back-up roll 54, with the sag removed from the horn. Preferably adjusting screw 124 and/or adjusting screw 174 are calibrated such that each revolution of the respective screw represents a known distance of advance of the respective horn or anvil roll. Such advance must, of course, take into account the lever arm between the respective screw, the point of pivotation, and the point of application of force by back-up roll 54. Thus, where the screw represents a second class lever applying force between the screw and the pivot point as in the illustrated embodiments, the distance traveled by the screw end of the lever arm will be greater than the distance traveled by the back-up roll 54. Respectively, the distances recited herein for advance of the back-up roll are distances effective at the back-up roll, though such distances may be determined based on measurements or calibrations determined at the adjusting screw.

In the illustrated embodiments wherein force is applied on the back-up roll through a second class lever, the lever arm is an element in the stiffness analysis. In embodiments wherein the force on the back-up roll is applied to cradle arm 112 in line with the axes of the back-up roll and the horn, there is no lever arm requiring bending stiffness analysis. In either analysis, bladder 138 provides relief for any overstressing condition at the nip, since the forces in excess of that being exerted by the bladder cause the bladder to move downwardly, thus widening the actual physical gap at the nip. In a like manner, stop cylinder 140 also accommodates deflection of load transmission assembly 136 in response to stress in the nip.

In conventional processes at least 0.009 inch of interference, typically greater than 0.010 inch, is required to achieve satisfactory force in the nip to obtain bonding with ultrasonic energy. Use of less interference in a conventional environment does not provide sufficient force in the nip to develop sufficiently high strength ultrasonic bonds. However, as noted earlier, the levels of interference conventionally used for continuous bonds, when used in an intermittent bonding process, are accompanied by the recited bounce, and the related inconsistency of bonding developed as a result.

In order for the horn and anvil to exert sufficient pressure at bonding nip 22, the horn and/or anvil must move toward each other to close and pressurize the nip. Description of the process starts with the horn and anvil spaced from each other, with the horn in dead load free sag with no support being applied directly to surface 42. 400 pounds of force is being exerted by bladder 138 against load cell 176. Back-up roll 54 is brought to a distance from the horn surface which represents the sag distance. Where, for example, the sag distance is 0.015 inch, roll is positioned 0.015 inch above the top of horn 20. Then support rolls 56A, 56B are brought into supporting contact with the sides of horn 20, and rolls 56A, 56B are further driven to lift the horn into contact with back-up roll 54. With support rolls 56A, 56B holding the horn against back-up roll 54. the horn is then held fixed by rolls 54, 56A, 56B collectively in its operating position. All that remains is to apply the interference pressure required to activate bonding responses to the ultrasonic energy passing through horn 20. To that end, adjusting screw 174 of the anvil support apparatus is turned the desired amount to apply the amount of "interference" force required to activate a bonding response in the workpiece segment and/or other workpieces being bonded. Typically, a force of about 400 pounds per inch width of the nip is sufficient to produce an acceptable ultrasonic bond in nip 22 while preserving the integrity of a typical non-woven workpiece segment used in fabricating absorbent articles such as diapers.

Figure 8:
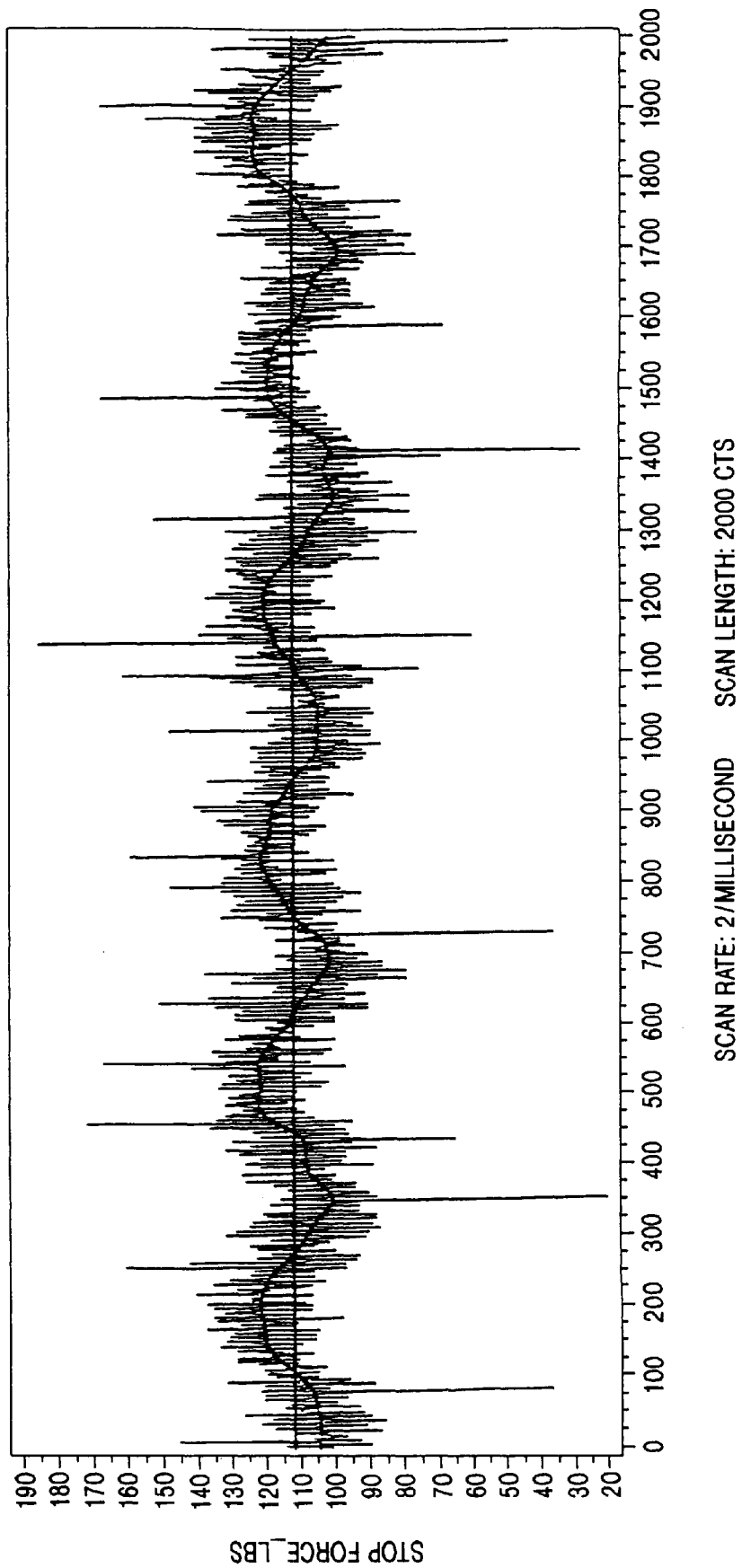
FIG. 8 shows a graph representing anvil stop force maintained in the nip through use of the closed loop control apparatus of the invention.

FIG. 8 illustrates a curve showing raw data readings as well as a line representing generally normalized readings of stop force at the load cell at various points in the rotation of the anvil roll at the nip. Generally, nip loads of 400 pounds per inch up to greater than about 1000 pounds per inch of nip width are needed to produce the desired bonds in material currently used in fabricating absorbent articles. The illustrated anvil support apparatus (FIG. 3) uses air bladder 138 to raise and hold anvil arm 152B against a fixed stop (load cell) 176. The amount of loading at the nip is controlled by adjusting the air pressure to the loading device (air bladder) 138, and inuring adjusting screw 174. For example, approximately 60 PSIG air pressure in the air bladder produces 150 pounds of force at the load cell (baseline of FIG. 8) or 375 pounds available at the anvil/horn nip. If, for illustrative purposes, the anvil pattern is about 0.25 inch wide, the resultant pressure in the nip would be a maximum load of 1500 pounds per inch (375 pounds/0.25 inch) nip width. Experimental data shows that there is a range of acceptable loads and horn amplitudes, but a typical value is that 0.003 inch of interference in the illustrated bonding apparatus 10, and using 60 PSIG air, produces an 80 pound reading at the load cell, with the balance of 70 pounds of load cell-equivalent force (150 pounds–80 pounds 70 pounds) being expressed at the nip. Such load cell force of 70 pounds equates to 175 pounds of force at the anvil (375/150×70), or 700 pounds per inch, assuming a 0.25 inch wide nip, (175 pounds/0.25 inch) nip width. A preferred alternative is to tare the initial load cell reading and display the change in load, when the anvil and horn are brought together to form a nip, as a positive number. The reading from the load cell can also be scaled to account for the lever arm between the load cell and the nip, thus to have the load cell display directly the load at the nip. The nip load can be divided by the nip width e.g. by the load cell to provide a resulting value of the nip load per inch nip width.

If back-up roll 54 is adjusted to account for a respective amount of horn sag, for example, generally being approximately 0.015 inch, above a portion of the unloaded horn surface 42 closest to back-up roll 54, substantially all the force distributed to O-rings 74 closest to the horn face due to the weight of the horn is removed, when the horn is lifted. Similarly, as first and second support rolls (56A, 56B) are urged inwardly against outer surface 42 of ultrasonic horn 20 thus lifting the horn upwardly against back-up roll 54, if the back-up roll is set to account for the respective amount of horn sag, as stated above, the lifting of the horn by support rolls 56A, 56B takes the load off O-rings-74 disposed closest to the horn face.

Figure 9:
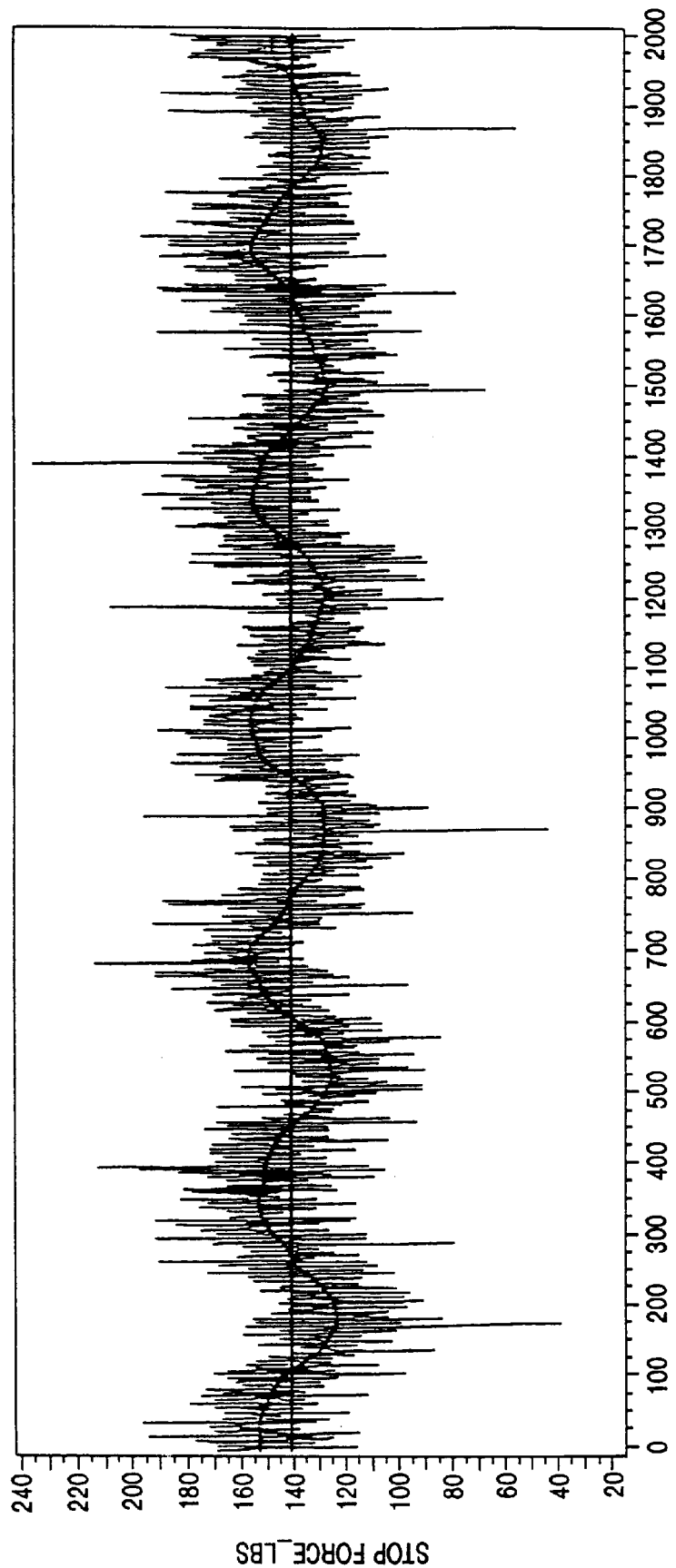
FIG. 9 shows a graph representing upper support wheel stop force maintained between the upper support wheel and the horn through use of the closed loop control apparatus of the invention.

FIG. 9 illustrates a curve showing raw data readings as well as a line representing generally normalized readings, of stop force between the horn and back-up roll at various points in their common rotation. The illustrated cradle arm 112, through back-up roll 54, of horn support apparatus 18 (FIGS. 2, 4) is held against load cell 120 by forces of both the anvil forcing the horn upward, and the support wheels 56A, 56B urging the horn in an upward direction. The amount of loading on back-up roll 54 is controlled by the closed loop control apparatus comprising load cell 120. programmable logic controller 119, and servo motor 127. Referring to FIG. 9, approximately 140 pounds of force at the load cell (baseline of FIG. 9) creates a sufficient amount of force to off-set upward forces created at the anvil/horn nip.

In the above scenario, the provision of back-up roll 54 eliminates or at least attenuates overhung load on shaft 76, whereby developing bonding force in the nip relies more on the stiffness and rigidity of horn support apparatus 18 than on the stiffness of shaft 76 and 0-ring supports. The pressure in bladder 138 provides the desired force to hold load transmission assembly 136 against adjusting screw 174.

In some embodiments, the output of the load cell in either the anvil loading assembly, or at the cradle arm of the back-up roll is first fed into a strain gauge isolated transmitter. The signal is then fed into a programmable logic controller having software capable of interpreting the signal, e.g. Rockwell Software RSLogix 5. If the signal average is at the setpoint of the load cell, the servo motor remains inactivated. If the signal average falls outside a threshold variance of e.g. about ±10 pounds, the controller program causes an adjustment device, e.g. servo motor, to adjust the stop position. The value of the threshold variance can, of course, be set at any value desired, greater than or less than 10 pounds, for a particular use contemplated for the bonding apparatus. As a further option, the output of load cell 120 can be used to control servo motor 178 and/or the output of load cell 176 can be used to control servo motor 127.

As indicated above, the force developed in nip 22 passes through a variety of elements to get back to frame 12. Accordingly, the critical structural consideration is the overall stiffness of the framed structure 10. Such stiffness can be achieved in various ways with various specifications for the respective elements of the structure. The important parameter is that the required interference level achieves a suitable force at nip 22 to develop ultrasonic bonds in the workpiece.

For example, strengthening. stiffening only the frame members (e.g. 26, 28, 30, 32) while not addressing members of anvil support apparatus 14 or horn support apparatus 18 can leave excess deflection in support apparatus 14 and/or 18. Correspondingly, stiffening support apparatus 14, 18 while not addressing the frame members can similarly leave excess deflection in the frame. Thus, whatever the starting structure not of this invention, the objective of achieving suitable stiffness is measured as the resulting amount of interference required to achieve good quality ultrasonic bonds. By thus expressing the invention in terms of the resulting interference, one can achieve the invention while being free to choose and design various elements, subassemblies, and assemblies while also freely selecting desired materials of construction, suitable to the user's specific application.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

Having thus described the invention, what is claimed is:

1. Ultrasonic bonding apparatus for creating ultrasonic bonds in sequentially advancing workpiece segments, in a nip defined by a rotary ultrasonic horn mounted for rotation about a first axis, and a rotary anvil roll mounted for rotation about a second axis substantially aligned with the first axis, said anvil roll comprising a width, a circumference, and a bonding portion disposed about at least a portion of the circumference, said ultrasonic bonding apparatus comprising:

(a) support structure comprising anvil support apparatus connected to said anvil roll, and horn support apparatus connected to said ultrasonic horn, said support structure supporting said bonding apparatus from a support;

(b) said anvil support apparatus comprising an anvil moving assembly for moving said anvil roll into contact with said ultrasonic horn, and for moving said anvil roll out of contact with said ultrasonic horn;

(c) closed loop control apparatus connected to one of said anvil support apparatus and said horn support apparatus, said closed loop control apparatus comprising a programmable logic controller, a load cell, and an adjustor, said ultrasonic horn and said anvil roll collectively being mounted and configured such that said ultrasonic horn and said anvil roll can be brought together to define the nip therebetween, and wherein said anvil roll and said ultrasonic horn can rotate in common with movement of workpiece segments through the nip, information output from said load cell triggering said closed loop control apparatus through said programmable logic computer and said adjustor to move said one of said anvil support apparatus and said horn support apparatus toward and away from the other of said anvil support apparatus and said horn support apparatus in automatic and dynamic response to the information output from said load cell, and thereby regulating pressure in the nip with ongoing real-time adjustments to distance between said anvil support apparatus and said horn support apparatus.

2. Ultrasonic bonding apparatus as in claim 1, said load cell being arranged and configured to measure representative nip loads, thereby to define forces generated between said ultrasonic horn and said anvil roll.

3. Ultrasonic bonding apparatus as in claim 1 wherein said adjustor comprises a servo motor.

4. Ultrasonic bonding apparatus as in claim 1, comprising a load cell conditioner connected to said load cell, said load cell conditioner amplifying output from said load cell.

5. Ultrasonic bonding apparatus as in claim 1, including a back-up roll juxtaposed adjacent said ultrasonic horn, opposite said anvil roll, and wherein said back-up roll engages an outer surface of said ultrasonic horn at an engagement locus in alignment with a line extending through extensions of the first and second axes.

6. Ultrasonic bonding apparatus as in claim 5, including a second adjustor mounted and configured for adjusting a height of said back-up roll, and thus generally defining a limit to movement of said ultrasonic horn away from said anvil roll.

7. Ultrasonic bonding apparatus as in claim 1 wherein said closed loop control apparatus is connected to said horn support apparatus.

8. Ultrasonic bonding apparatus as in claim 1 wherein said closed loop control apparatus is connected to said anvil support apparatus.

9. Ultrasonic bonding apparatus as in claim 1, said anvil moving assembly defining a limit to travel of said anvil support apparatus away from said horn support apparatus, thus defining a limitation to withdrawal of said anvil roll from the nip.

10. Ultrasonic bonding apparatus as in claim 1, including first and second support rolls releasably supporting opposing sides of an outer surface of said ultrasonic horn.

11. Ultrasonic bonding apparatus as in claim 10 wherein axes of said first and second support rolls are positioned lower than the axis of the ultrasonic horn, whereby urging said first and second support rolls inwardly against the outer surface of said ultrasonic horn lifts said ultrasonic horn upwardly against said back-up roll.

12. Ultrasonic bonding apparatus as in claim 1, including drawing apparatus, capable of drawing the workpiece segments through said bonding apparatus, across said anvil roll, and thus through the nip defined between said anvil roll and said ultrasonic horn, at a threading speed of at least about 40 feet per minute.

13. Ultrasonic bonding apparatus as in claim 1, including drawing apparatus, capable of drawing the workpiece segments through said bonding apparatus, across said anvil roll, and thus through the nip defined between said anvil roll and said ultrasonic horn, at a speed of at least about 600 feet per minute.

14. Ultrasonic bonding apparatus as in claim 1, said support structure being sufficiently rigid that said ultrasonic horn and said anvil roll can be brought together with deflection levels of said horn support apparatus and said anvil support apparatus, in combination, being no more than about 0.003 inch in combination with defining sufficient nip pressure to develop ultrasonic bonds in the workpiece segments passing through the nip.

15. Closed loop control apparatus for managing pressure generated in a nip, the nip being defined between a rotary ultrasonic horn mounted for rotation about a first axis, and an anvil roll mounted for rotation about a second axis, substantially aligned with the first axis, and wherein the anvil roll is mounted to support structure by anvil support apparatus, and the ultrasonic horn is mounted to the support structure by horn support apparatus, said closed loop control apparatus comprising:

(a) an adjustor mounted in adjusting relationship with respective one of the anvil support apparatus and the horn support apparatus;

(b) a load cell connected to one of the anvil support apparatus and the horn support apparatus, said load cell quantifying force representative of pressure being generated in the nip; and (c) a programmable logic controller connected to said load cell and to said adjustor, for communication with said load cell and said adjustor.

16. Closed loop control apparatus as in claim 15, said closed loop control apparatus further comprising a strain gauge isolated transmitter converting force applied on said load cell into signal output.

17. Closed loop control apparatus as in claim 16 wherein said load cell transmits the signal output to said programmable logic controller.

18. Closed loop control apparatus as in claim 15 wherein said anvil support apparatus can be raised or lowered by said adjustor in response to output of said load cell and said programmable logic controller until force applied to said anvil support apparatus results in desired ultrasonic bond-creating pressure in the nip.

19. Closed loop control apparatus as in claim 15 wherein said horn support apparatus has a first end portion mounted to said support structure, and a second end portion remote from the first end portion, and disposed on a horn moving assembly.

20. Closed loop control apparatus as in claim 19, said closed loop control apparatus being operatively connected to said anvil support apparatus, a second closed loop control apparatus being connected to said horn moving assembly, thereby providing a second control for managing pressure in the nip, said second closed loop control apparatus comprising a second adjustor mounted in adjusting relationship with said horn moving assembly, and a second load cell connected to one of the horn moving assembly and said second adjustor and outputting information to a suitable programmable logic controller.

21. A method of creating ultrasonic bonds in sequentially advancing workpiece segments, the method comprising:

(a) passing the workpiece segments through a nip defined by a support structure comprising anvil support apparatus supporting an anvil roll mounted for rotation about a first axis, horn support apparatus being connected to and supporting a rotary ultrasonic horn mounted for rotation about a second axis, substantially aligned with the first axis, the anvil support apparatus comprising an anvil moving assembly for moving the anvil roll into contact with the ultrasonic horn, and for moving the anvil roll out of contact with the ultrasonic horn, closed loop control apparatus being connected to one of the anvil support apparatus and the horn support apparatus, the closed loop control apparatus comprising a programmable logic controller, a load cell, and an adjustor;

(b) activating ultrasonic energy in the ultrasonic horn; and (c) rotating the ultrasonic horn and the anvil roll in common with movement of the workpiece segments through the nip, thereby applying pressure to the workpiece segments at the nip, and correspondingly creating ultrasonic bonds in the workpiece segments passing through the nip, the programmable logic controller being connected to the load cell and the adjustor, and communicating with the load cell and the adjustor, and regulating pressure in the nip by ongoing real-time adjustments to the distance between the anvil support apparatus and the horn support apparatus.

22. A method as in claim 21, including sensing nip loads using the load cell, the nip loads representing forces expressed between the ultrasonic horn and the anvil roll at the nip.

23. A method as in claim 21, the nip having a width defined between the ultrasonic horn and the anvil roll, including employing the horn support apparatus and the anvil support apparatus, collectively, thereby to define a set-point target nip pressure of at least about 400 pounds per inch width of the nip.

24. A method as in claim 23 including initiating adjustment to the anvil moving assembly when nip load deviates from a target nip load by at least about 10 pounds per inch width of the nip.

25. A method as in claim 23, including adjusting the anvil moving assembly when loading in the nip corresponding to a bonding portion of the anvil roll varies by more than about 10 pounds per inch width of the nip from the target nip loading.

26. A method as in claim 21, including connecting a load cell conditioner to the load cell, and thereby amplifying output from the load cell.

27. A method as in claim 21, including connecting the closed loop control apparatus to one of the horn support apparatus and the anvil support apparatus.

28. A method as in claim 27, including managing pressure in the nip by employing the closed loop control apparatus as a first closed loop control apparatus connected to the anvil support apparatus, and employing second closed loop control apparatus connected to the horn support apparatus, at least one of the first and second closed loop control apparatus comprising an adjustor mounted in adjusting relationship with the respective support apparatus, and a load cell connected to at least one of the horn support apparatus and the anvil support apparatus, and the respective adjustor.

29. A method as in claim 21, including processing information output from the load cell in the programmable logic controller and correspondingly raising and lowering one or both of the anvil support apparatus or the horn support apparatus, thereby regulating the pressure in the nip.

30. A method as in claim 21, including applying first and second support rolls to sides of the ultrasonic horn and moving the ultrasonic horn into engagement with a back-up roll aligned with extensions of the first and second axes such that the first and second support rolls, in combination with the back-up roll, define a fixed location of operation of the ultrasonic horn.

31. A method as in claim 21 wherein the bringing of the anvil roll and the ultrasonic horn together comprises lifting the anvil roll, thereby to bring the anvil roll into engaging relationship with the ultrasonic horn.

32. A method as in claim 21, including limiting downward movement of the anvil moving assembly and thereby preventing disengagement of drive apparatus which transmits drive power between the anvil support apparatus and the horn support apparatus.

33. A method as in claim 30, including adjusting height of the back-up roll and thereby controlling the location of operation of the ultrasonic horn.

34. A method as in claim 30, including releasing the support rolls, causing the horn to drop out of engagement with the back-up roll, and subsequently re-engaging the support rolls with the ultrasonic horn, and thus bringing the ultrasonic horn back into engagement with the back-up roll, and thereby returning the ultrasonic horn to the defined location of operation of the ultrasonic horn.

35. A method as in claim 21, including using the load cell to measure, and to dynamically manage, nip loads expressed in the nip, in real time.

36. A method of managing pressure generated in a nip, the nip being defined between a rotary ultrasonic horn mounted on horn support apparatus, and an anvil roll mounted on anvil support apparatus, the anvil support apparatus being mounted to a support structure, and defining an adjustable anvil moving assembly, the horn being mounted in general alignment with the anvil roll to define the nip therebetween such that outer working surfaces of the ultrasonic horn and the anvil roll are generally defined in a common surface at the nip, the method comprising:
  (a) employing a load cell connected to one of the horn support apparatus and the anvil support apparatus, and thereby receiving and quantifying force representative of force expressed between the ultrasonic horn and the anvil roll at the nip;
  (b) converting the force applied at the load cell into a communications signal output;
  (c) transmitting the communications signal output to a programmable logic controller programmed to activate an adjustor; and
  (d) employing the adjustor to raise or lower the respective anvil support apparatus or horn support apparatus so as to adjust the force being expressed between the anvil roll and the horn at the nip to a desired bond-creating pressure.

37. A method as in claim 36, including employing a target nip pressure of at least about 400 pounds per inch width of the nip.

38. A method as in claim 37, including adjusting location of the respective anvil support apparatus or horn support apparatus when pressure in the nip corresponding to a bonding portion of the anvil roll deviates from the target nip pressure by a defined number of pounds per inch width of the nip.

39. A method as in claim 38, the defined number of pounds being about 10 pounds per inch width of the nip.

40. A method as in claim 36, including the horn support apparatus having a first end portion fixed to the support structure, and a second end portion remote from the first end portion, disposed on a horn moving assembly, the method including at least in part managing pressure in the nip by connecting closed loop control apparatus to the horn moving assembly.

* * * * *